United States Patent [19]

Di Giulio et al.

[11] Patent Number: 5,390,351

[45] Date of Patent: Feb. 14, 1995

[54] SYSTEM FOR COMMUNICATING WITH PLURAL NODES IN PREDETERMINED INTERVALS DEPENDED ON INTEGERS ASSIGNED AND CHANGED BASED UPON CONFIGURATION THEREOF

[75] Inventors: Peter C. Di Giulio, Fairfield; James L. Harman, Southport; David K. Lee, Monroe; Frederick W. Ryan, Jr., New Haven, all of Conn.

[73] Assignee: Pitney Bowes Inc., Stamford, Conn.

[21] Appl. No.: 847,537

[22] Filed: Mar. 6, 1992

[51] Int. Cl.$^6$ .................... G06F 1/04; G06F 13/00
[52] U.S. Cl. .................... 395/725; 395/200; 364/221.5; 364/222; 364/231.4; 364/DIG. 1; 364/942.1; 364/940.64; 364/942.5; 364/DIG. 2
[58] Field of Search ............ 395/200, 275, 725; 341/125.52

[56] References Cited

U.S. PATENT DOCUMENTS

| | | | |
|---|---|---|---|
| 4,177,450 | 12/1979 | Sarrand | 340/147 |
| 4,365,293 | 12/1982 | Holtz | 364/200 |
| 4,398,264 | 8/1983 | Cooper et al. | 364/900 |
| 4,456,956 | 6/1984 | El-Gohary et al. | 364/200 |
| 4,536,838 | 8/1985 | Ringel et al. | 364/200 |
| 4,550,366 | 10/1985 | Toyama et al. | 364/136 |
| 4,682,168 | 7/1987 | Chang et al. | 340/825.65 |
| 4,847,832 | 7/1989 | Chang et al. | 370/85 |
| 4,972,313 | 11/1990 | Getson, Jr. et al. | 364/200 |
| 4,972,314 | 11/1990 | Getzinger et al. | 395/425 |
| 5,005,122 | 4/1991 | Griffin et al. | 395/200 |
| 5,167,019 | 11/1992 | Fava et al. | 395/200 |
| 5,167,035 | 11/1992 | Mann et al. | 395/575 |
| 5,198,990 | 3/1993 | Farzan et al. | 364/560 |
| 5,208,809 | 5/1993 | Fergeson et al. | 370/91 |
| 5,287,520 | 2/1994 | Kaiser | 395/725 |

FOREIGN PATENT DOCUMENTS

| | | |
|---|---|---|
| 0133567 | 8/1984 | European Pat. Off. . |
| 0200365 | 3/1986 | European Pat. Off. . |
| 0230116 | 12/1986 | European Pat. Off. . |
| 0355042 | 2/1989 | European Pat. Off. . |

OTHER PUBLICATIONS

EPO Search Report, Dated Nov. 22, 1993.
Time Critical Communication Networks: Field Buses 8302 IEEE Network 2 (1988) May, No. 3, New York.
Choosing A Network For Local Industrial Control, 2119 EDN Electrical Design News 33 (1988), Nov. 24, No. 24 Newton Mass.
IEEE International Conference On Communications BOSTONICC/89 World Prosperity Through Communication Boston, Mass. Jun. 11–14, 1989.
Robots In Manufacturing, 8279 Robotics 4 (1988) Jun. No. 2, Amsterdam, The Netherlands.
Patent application Ser. No. 07/847,542, filed Mar. 6, 1992, Inventor P. DiGiulio, D. Lee, D. Riley and F. Ryan, Jr.
Patent application Ser. No. 07/847,505, filed Mar. 6, 1992, Inventor P. DiGiulio, D. Lee, D. Riley and F. Ryan, Jr.
Article entitled "The FIP Protocol" Philippe Leterrier Development Manager.
C. Bardwell-Jones, "SSD . . . " Proceed. of the 3rd Annual Motion Control Tech. Conf. E., Mar. 1991, Boston, Mass., pp. 1–25.

(List continued on next page.)

Primary Examiner—Thomas C. Lee
Assistant Examiner—Sang Hui Kim
Attorney, Agent, or Firm—Robert H. Whisker; Melvin J. Scolnick

[57] ABSTRACT

A cost-effective motion control system communication architecture is provided that supports a centralized control node, distributed control nodes, and smart I/O peripheral control nodes. Networks designed using this architecture, which employs a serial bus, may be readily modified or expanded. The architecture supports both real-time highly periodic communications and event-driven peer-to-peer communications.

9 Claims, 21 Drawing Sheets

OTHER PUBLICATIONS

R. P. Brennan, "The SERCOS Inter. . . . " present at: PCIM/POWER QUALITY '90 Phil, Pa. pp. 1-8 Oct. 24, 1990.

T. Bucella, "Using The Trajectory Regulator Protocol," Proceed of the 3rd Annual Conf/E, Mar. 1991, Boston, Mass. pp. 1-8.

S. Cortese, "SERCOS-Real . . . " Proceed. of the 3rd Annual Motion Control Tech. Conf. E., Mar. 1991, Boston, Mass. pp. 14-25.

S. Cortese, "An Evaluation of SSD's Link Interface," Apr. 5, 1991.

M. Dolin, "Boundary Scan Makes Inroads into PCB Testing," Computer Design, p. 50, Dec. 1991.

Weaver, Lachner & Boekestein, "A Compact . . . " Proceed. of the 3rd Annual Mot. Cont. Tech. Conf/E. Mar. 1991 Boston, Mass. pp. 9-13.

Int. Stand. Organ., ISO/TC97: Inf. Proc. Sys. Open Syst. Inter. Basic Ref. Model, Draft Int. Stand ISO/DIS 7498. Apr. 1982.

"IBM Synchronous Data Link Control," General Info. IBM form GA27-3093.

EIA recommend. stand. RS485: Stand. for elect. char. of gen. and rec. for use in bal. dig. multi-point syst EIA Apr. 1983.

SN65ALS176 RS422A and RS-485 differential bus transceivers: Interface Circuits Data book. Texas Instruments, 1991.

International Standard ISO 8802-2 IEEE Std. 802.2 "Information Processing sytems-Local area . . . " 1989-Dec. 31.

FCC Class B/VDE 0871.

IEEE Standard 1149.1-1990, "IEEE Stand. Test Access Port and Boundary . . . ", IEEE Inc. 345 E. 47th St. N.Y. N.Y. 10017.

| STARTING FLAG | 8 BIT DESTINATION ADDRESS | 8 BIT CONTROL | OPTIONAL DATA | 16-BIT CRC | ENDING FLAG |

FIG. 17

| STARTING FLAG | 8 BIT DESTINATION ADDRESS | 8 BIT CONTROL | UP TO 8 BYTES | 16-BIT CRC | ENDING FLAG |

FIG. 18

| STARTING FLAG | 8 BIT DESTINATION ADDRESS | 8 BIT CONTROL | 8 BIT SOURCE ADDRESS | UP TO 33 BYTES OF DATA | 16-BIT CRC | ENDING FLAG |

SDLC DATA FIELD

FIG. 19

Flag /BCA/DCF1/ BRS/CRC/Flag ----→
                              ←---- no response

FIG. 20

CCN                          PCN or DCN
Flag /BCA/DCF2/ADD/CRC/Flag -→
                              ←--Flag/CCN/DCF22/CRC /Flag

FIG. 21A

CCN                          PCN or DCN
Flag/BCA/DCF3/ADD/CRC/Flag --→
                              ←--Flag/CCN/DCF33/CRC/Flag

FIG. 21B

CNN                    DCN
Flag/DA/DCF3A/ADD/CRC/Flag -->
                    <-- Flag/CCNA/DCF99/CRC/Flag
                        (acknowledgement frame)

*FIG. 22*

CCN                PCN
Flag/DA/DCF4/CRC/Flag ---->
                <----Flag/CCNA/DCF44/DATA8/CRC/Flag

*FIG. 23A*

CCN                    DCN
Flag/DA/DCF5/CRC/Flag -->
                Flag/CCNA/DCF55/SADD/DATA33/CRC/Flag

*FIG. 23B*

CCN                                PCN
Flag/DA/DCF6/DATA8/CRC/Flag →
                          ← Flag/CCNA/DCF66/DATA8/CRC/Flag

*FIG. 24A*

CCN                                DCN
Flag/DA/DCF6/DATA8/CRC/Flag →
                          ← Flag/CCNA/DCF99/CRC/Flag
                             (acknowledgement frame)

*FIG. 24B*

CCN                                DCN
Flag/DA/DCF9/DATA33/CRC/Flag →
                          ← Flag/CCNA/DCF99/CRC/Flag

*FIG. 25*

Flag/BCA/DCF7/CRC/Flag ---->
<---- no response

FIG. 26

CCN                              DCN
Flag/DA/DCFA/DATA33/CRC/Flag -->
                    <-- Flag/CCNA/DCF99/SADD/CRC/Flag

FIG. 27

CCN                      DCN
Flag/DA/DCFx/CRC/Flag -->
              <-- Flag/CCN/DCFx/CRC/Flag

FIG. 28

CCN                         DCN
Flag/DA/DCFB/CRC/Flag→
                    ←--Flag/CCNA/DCFBB/SA/DATA33/CRC/Flag

FIG. 29A

Flag/DA/DCFB/CRC/Flag---→
                    ←----Flag/CCNA/DCFBC/CRC/Flag

FIG. 29B

CCN                         DCN
Flag/DA/DCF8/DATA8/CRC/Flag→
                         ←
                    Flag/CCNA/DCF88/DATA8/CRC/Flag

FIG. 30

Flag/DA/DCFC/DATA33/CRC/Flag →
 ← Flag/CCNA/DCF99/CRC/Flag

*FIG. 31*

Flag/BRA/DCFD/SCN/CRC/Flag → (CCN broadcast)
Flag/DCN1/DCFE/DCN2/DATA33/CRC/Flag → (DCN1 transmits to DCN2)
 ← Flag/DCN2/DCF99/CRC/Flag
(ack from DCN1 to DCN2)

*FIG. 32*

| UPDATE RATE | | | | TIME UNTIL UPDATE | | | |
|---|---|---|---|---|---|---|---|
| 7 | | | | | | | 0 |

FIG. 35

| ERR | CM | RT | NT | | | | |
|---|---|---|---|---|---|---|---|
| 7 | | | | | | | 0 |

ERR - ERROR BIT
CM - CPU MODIFY BIT
RT - RECEIVE TOGGLE BIT
NT - NO TRANSMIT LAST TIME BIT

FIG. 36

| | # OF BYTES TO RECEIVE | | | | # OF BYTES TO TRANSMIT | | |
|---|---|---|---|---|---|---|---|
| 7 | | | | | | | 0 |

FIG. 37

SYSTEM FOR COMMUNICATING WITH PLURAL NODES IN PREDETERMINED INTERVALS DEPENDED ON INTEGERS ASSIGNED AND CHANGED BASED UPON CONFIGURATION THEREOF

BACKGROUND OF THE INVENTION

This invention relates to a communications architecture for motion control systems such as robotic systems, automotive systems, or article processing systems, particularly for paper handling systems. In paper handling systems sheets of paper are passed in a generally sequential manner through a series of motor-driven components, such as belts and rollers. Frequently sheets experience high velocities and sharp accelerations during the hand-off from one belt or roller to the next. The operation of the motion control components must be carefully coordinated in real time to ensure component-to-component transitions are smooth and jam free. It is also often beneficial to monitor sheet positions, as well as motor shaft positions and velocities with sensors. Typically motion control, sensor control, and general system functions are controlled by at least one processor. Control signals must be delivered to mechanical prime movers (motors, solenoids, transducers, etc.) and sensor data received from the sensors. If there is more than one processor in the system, processor-to-processor communication must be supported as well. Additionally, in modular paper handling systems it is necessary to provide means for reconfiguring the system and adding new modules.

It would be desirable to be able to provide a motion control system communication architecture that allows the system to be configured with a centralized control node and peripheral control nodes.

It would also be desirable to be able to provide a communication architecture that allows the simple incorporation of additional modules into the system.

SUMMARY OF THE INVENTION

It is an object of the present invention to be able to provide a motion control system communications architecture that allows the system to be configured with a central control node and plurality of peripheral control nodes with scheduled communications between nodes. The schedule is made up of a sequence of equal, periodic time intervals and associates an integer with each of the peripheral control nodes. The central control node communicates with each peripheral control node every n intervals; where n is the integer associated with each particular peripheral control node.

In a preferred embodiment of the subject invention the network includes a mechanism for providing the central control node with configuration data which identifies each peripheral control node and its physical location in the network, and the central control node determiners the schedule in accordance with the configuration data.

In another preferred embodiment a peripheral control node may be selectively configured either to respond immediately to communication with the central control node to output signals or input status, or to respond to communication with the central control node to output signals or input status upon receipt of a synchronization signal.

In accordance with the invention, a motion control communication architecture using a communications network is provided that has the necessary flexibility for providing scheduled centralized control node communication with peripheral control nodes.

It would also be desirable to be able to reduce the quantity of wire required to connect the various elements in motion control systems.

It would also be desirable to be able to provide a motion control system communication architecture that allows wiring to be readily isolated from electro-magnetic and radio frequency interference.

It would also be desirable to be able to provide a motion control system communication architecture that allows for an increase in the number of common parts used, both within a product line and from a product line, thereby reducing system cost.

It would also be desirable to be able to provide a motion control system communication architecture that allows systems to be readily reconfigured.

It would also be desirable to be able to provide a motion control communications architecture that offers application level support services at power-up, including manufacturing and service diagnostics and that automatically configures a network after system reconfiguration.

It would also be desirable to be able to provide an architecture that allows motion control system nodes to be boundary scannable for testing, and to have boundary scan information be transferable to or from a single network connection point to provide for manufacturing test and servicing diagnostics.

It would also be desirable to be able to provide a motion control system communication architecture that allows the adjustment of the communications baud rate to achieve an optimum cost/performance trade-off.

BRIEF DESCRIPTIONS OF THE DRAWINGS

The above and other objects and advantages of this invention will be apparent upon consideration of the following detailed description, taken in conjunction with the accompanying drawings in which like reference characters refer to like parts throughout, and in which:

FIG. 17 is a diagram of a control frame from a CCN according to the invention;

FIG. 18 is a diagram of a data frame from the CCN to a PCN or vice versa according to the invention;

FIG. 19 is a diagram of a data frame from a DCN (CCN) to a DCN according to the invention;

FIG. 20 is a diagram of a network frame exchange for baud rate setting according to the invention;

FIGS. 21A and 21B are diagrams of CCN frame exchanges according to the invention;

FIG. 22 is a diagram of a network configuration frame exchange according to the invention;

FIGS. 23A and 23B are diagrams of status inquiries by the CCN according to the invention;

FIGS. 24A and 24B are diagrams of writes to a control/configuration register according to the invention;

FIG. 25 is a diagram of a frame exchange for access priority assign/cancel to a DCN according to the invention;

FIG. 26 is a diagram of a synchronization (SYNC) frame broadcast according to the invention;

FIG. 27 is a diagram of a boundary scan frame exchange according to the invention;

FIG. 28 is a diagram of a clock-once frame to propagate boundary scan data according to the invention.

FIGS. 29A and 29B are diagrams of polling of DCNs for a boundary logic result according to the invention;

FIG. 30 is a diagram of a data frame exchange between the CCN and a PCN according to the invention;

FIG. 31 is a diagram with a data frame exchange from the CCN to a DCN according to the invention;

FIG. 32 is a diagram of a data frame from a DCN to another DCN according to the invention;

FIG. 35 is a diagram of a tick status byte according to the invention;

FIG. 36 is a diagram of a data status byte according to the invention;

FIG. 37 is a diagram of a message length according to the invention; and

DETAILED DESCRIPTION OF THE INVENTION

In the motion control environment, it is important not only to support real-time motion control, but also to allow communication between other elements of the system. These elements may have characteristics that give rise to a separate set of communication requirements distinct from those of the motion-based elements. For example, system configuration parameters may be periodically input by an operator. This information is supplied to components of the system asynchronously. Further, intelligent system components may need to execute peer-to-peer communications asynchronously as well. In contrast to this event-driven mode of communication, high performance tightly coupled motion control elements must usually be driven in real-time via a high-bandwidth channel.

The present invention provides a communication architecture that is sufficiently flexible to accommodate both synchronous and asynchronous communications in motion control systems. The architecture also employs a serial bus, that can reduce the wiring required to interconnect the system, particularly when the physical layout incorporates a linear arrangement of components. The serial bus arrangement is also easier to shield than other arrangements, and provides for an increase in the number of common parts in the system, which reduces the cost per unit, and thus total system cost. A wide variety of motor control systems configurations are supported by the architecture of the present invention, which allows systems using the architecture to be readily modified or expanded, and for new systems to be easily developed.

Figure 1:
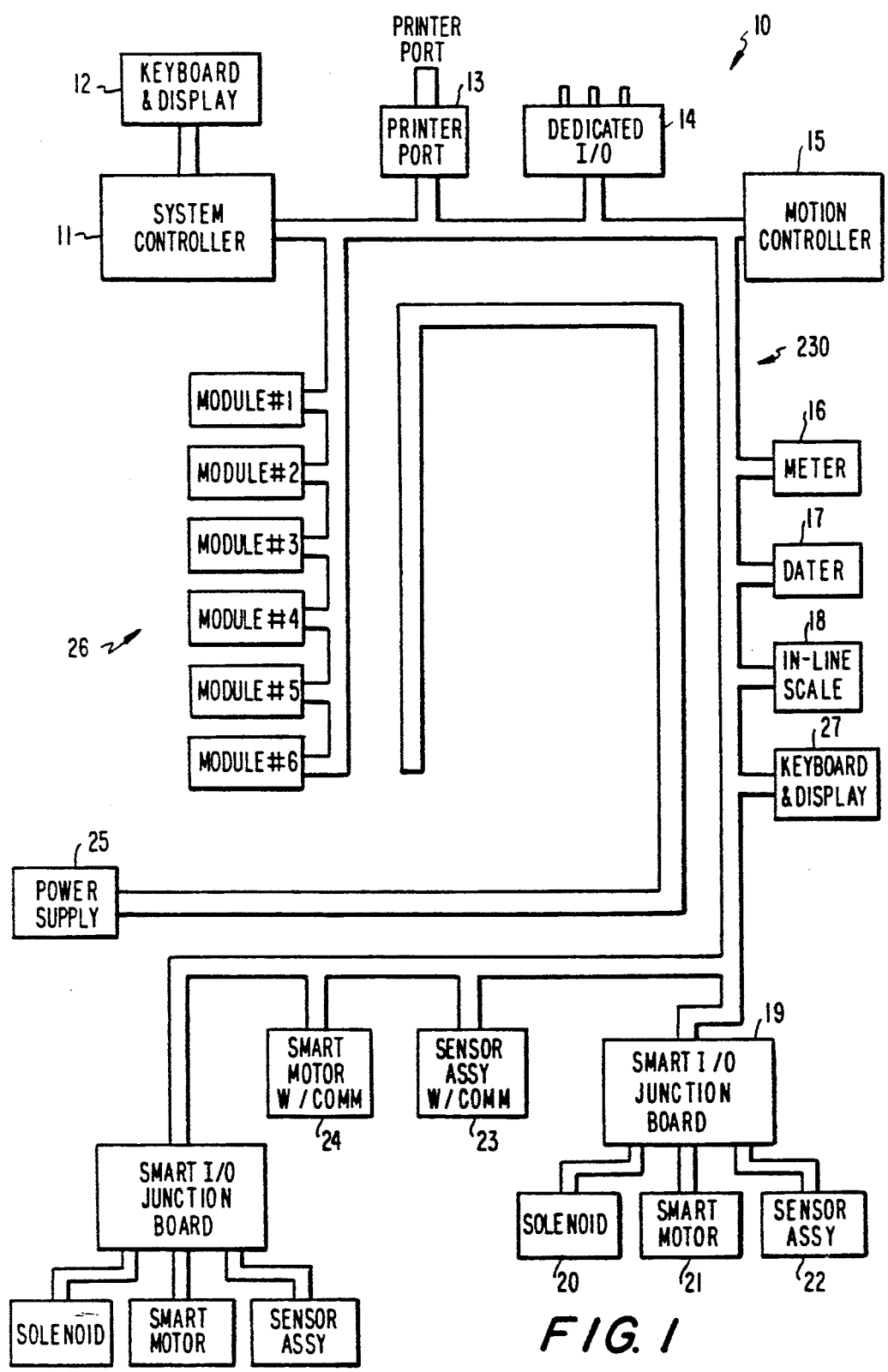
FIG. 1 is a block diagram of the elements of a system interconnected in accordance with a preferred embodiment of the architecture of the present invention.

Shown in FIG. 1 is a schematic diagram of a system implementation of motor control communication architecture 10 of the present invention. The specific system shown is a mailing system, which has system controller 11 and keyboard and display 12 for interfacing with an operator. The system also has motion controller 15 for driving solenoids 20, for driving smart motors 21, and for receiving data from sensor assembly 22, each via serial bus 230 and smart I/O junction board 19. Occasionally, due to placement concerns, it is economical to substitute a sensor assembly 23 with built-in communication circuitry and a smart motor 24 with built-in communication circuitry for the arrangement using junction board 19. System controller 11 and motion controller 15 communicate asynchronously via bus 230. Additionally, modules such as meter 16, dater 17, in-line scale 18, printer port 13, and dedicated I/O 14 communicate via bus 230. The system may also contain optional modules 26 to provide, for example, a modem for external communication or a floppy disk drive. The components of the mailing system are powered by power supply 25, which is distributed to all the nodes as shown.

Motion control architecture 10 supports three types of components, or nodes. Referring to FIGS. 1–6, the supported node types are central control node (CCN) 210, distributed control nodes 310, and peripheral control nodes 220, which may be configured as shown.

The different node types are characterized both by their level of electronic sophistication and by their role in the overall system architecture. A central control node 210 contains significant local processing power in the form of a central processing unit (CPU). This node mediates communications between the less sophisticated, distributed control nodes 310, which are also typically CPU based. The central control node 210 is also the node that can directly drive peripheral control nodes 220, the least sophisticated type of control node.

Distributed control nodes 310 are nodes that typically contain a local processor. However, distributed control nodes 310 can not mediate node to node communications as can central control node 210.

The least sophisticated type of control node is peripheral control node 220. Peripheral control nodes 220 contain a moderate level of electronic circuitry for interfacing with hardware components such as motors, but are not CPU-based. Peripheral control nodes can be driven by the central control node 210, but cannot control the network, or initiate communications.

The various system components shown in FIG. 1 can be characterized by their node type. Motion controller 15 typically assumes the role of central control node 210, while the arrangement of junction board 19 with solenoid 20, smart motor 21 and sensor assembly 22 constitutes one of peripheral control nodes 220. Sensor assembly 23 with built-in communication circuitry and smart motor 24 with built-in communication circuitry are also peripheral control nodes 220, as is the keyboard and display 27. The remaining modules shown in FIG. 1, such as meter 16 and dater 17, are typically distributed control nodes 310, although alternate arrangements are possible. For instance, system controller 11 could be CCN 210, or printer port 13 could be configured as one of PCNs 220 rather than DCN 310. It is also possible to use dedicated I/O 14, which is one of PCNs 220, as a low cost means of providing an interface between central control node 210 and a central processing unit (CPU), via serial bus 230.

Figure 2:
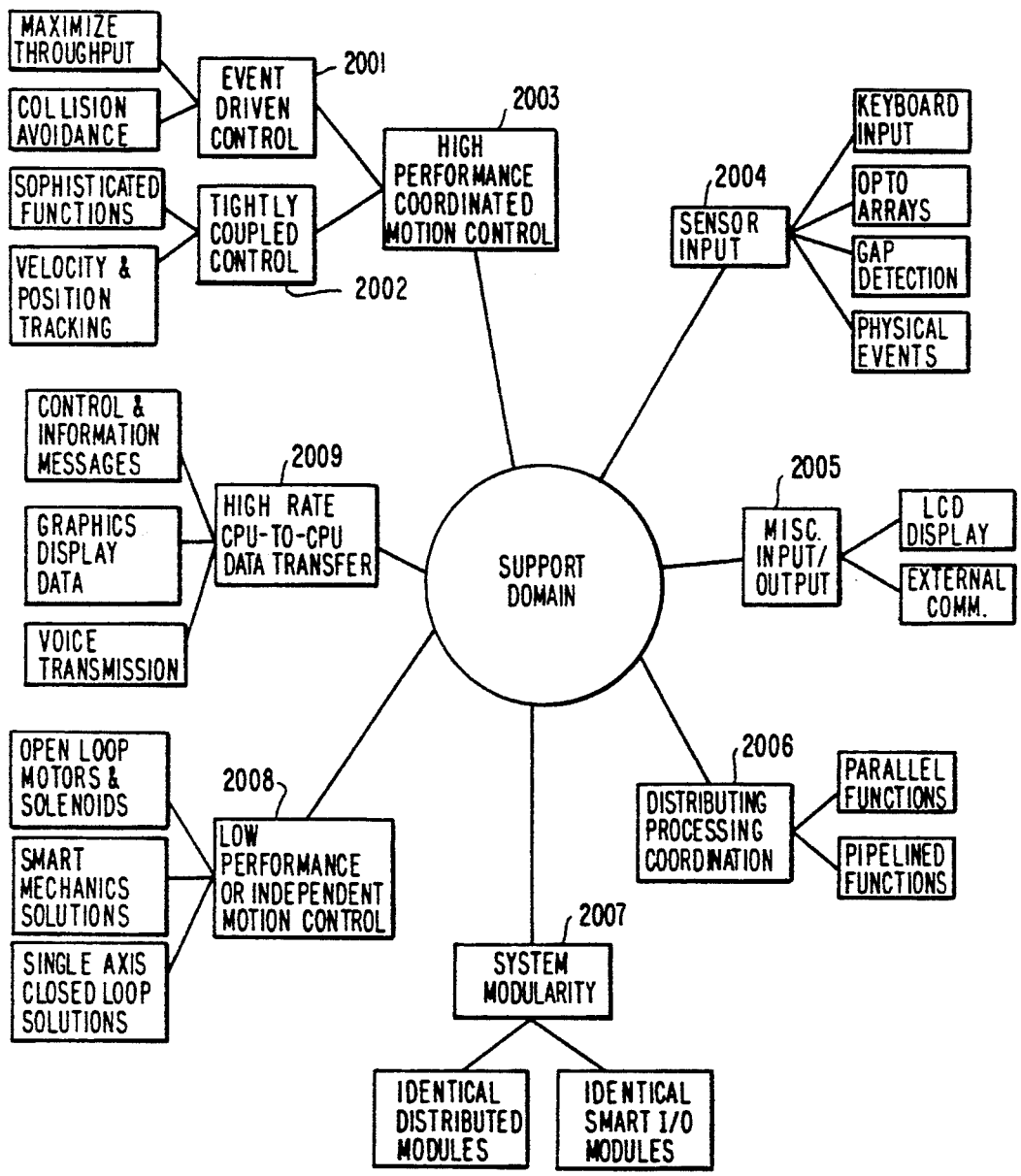
FIG. 2 is a schematic diagram showing the support domain of the architecture according to the invention.

Referring to FIG. 2, which shows the support domain of architecture 10 at a more general level than is shown in FIG. 1, the function of event-driven control 2001 may be achieved using either one of PCNs 220 or DCNs 310, while the function of tightly coupled control 2002 is typically achieved using one of PCNs 220. The function of sensor input 2004 is usually achieved using PCNs 220, although some functions may employ DCNs 310. Miscellaneous input/output functions 2005 generally are achieved using DCNs 310 or PCNs 220. System modularity 2007 may be achieved using both PCNs 220 and DCNs 310. The general function of high performance coordinated motion control 2003 is typically achieved using one of PCNs 220. The functions characterized as low performance or independent motion control 2008 may be achieved by PCNs 220 or DCNs 310, while high rate CPU-to-CPU data transfers 2009 are preferably achieved using DCNs 310.

In all operating modes, CCN 210 performs the network control function. In one operating mode, centralized control, a network master CPU-based CCN 210) controls multiple PCNs 220, which are not CPU-based, but rather contain smart input/output (I/O) logic processing hardware and serial communication logic. Typical I/O processing functions include pulse width modulation, quadrature decoding, sensor scanning, etc. PCNs 220 provide a moderately sophisticated interface to the motion control elements, such as motors, solenoids, and sensors in the system.

With distributed control, CPU-based DCNs 310 can perform assigned tasks independent of CCN 210, while CCN 210 enables communication among DCNs 310.

A hybrid system with both DCNs 310 and PCNs 220 is also supported, as is an arrangement allowing for system expansion via branching.

Figure 3:
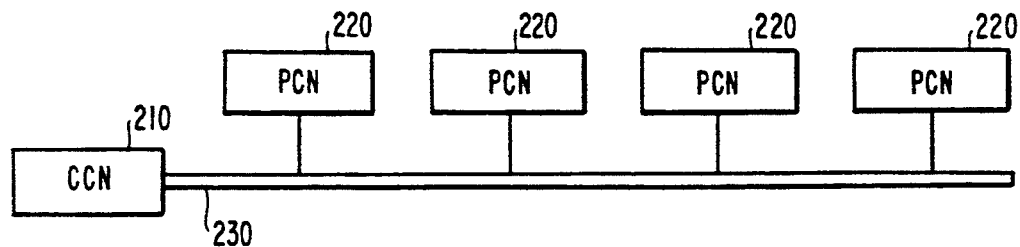
FIG. 3 is a block diagram of centrally controlled configuration according to the invention.

A high performance motion control environment consisting of many PCNs 220 (smart I/O servo motor and sensor nodes) is supported under centralized control, shown schematically in FIG. 3. CCN 210 sends motion control data to servo motors and solenoids and receives sensor status and motor encoder shaft position data from motors and sensors, respectively. The communication of this data contains error detection logic. As control/status data is refreshed to/from these nodes at very high rates, data retransmission is not needed when errors are detected. Up to 31 of PCNs 220 can be connected to the multi-drop serial communication bus 230. Each of PCN 220 is implemented entirely by hardware logic without a CPU. PCNs 220 receive messages only from CCN 210. PCN 220 decodes the message, performs the assigned functions in the message, assembles a response message, and transmits it to CCN 210. In general, commands from CCN 210 are to control the output lines of PCNs 220, whereas responses from PCNs 220 are to report the status of PCN 220 input lines. Application hardware logic of PCNs 220 provides intelligent processing of the output commands of CCN 210 and the raw input data of PCN 220 to eliminate the low level I/O processing by CCN 210. In order to make communication with PCNs 220 simple, immediately after CCN 210 sends a message to one of PCNs 220, it demands an immediate response message. This response message is also used by CCN 210 as an implied acknowledgement to its message. PCN 220 to PCN 220 communication is not allowed.

The distributed control mode supports communication among intelligent nodes in the system. In this mode, control and data will be communicated to support the following: processor-to-processor communications, motor commands, motor/sensor status, initialized commands, diagnostic messages and error status. This control oriented data communication makes full use of error detection, retransmission, and duplicate message protection at both data packet and multi-packet message levels.

Figure 4:
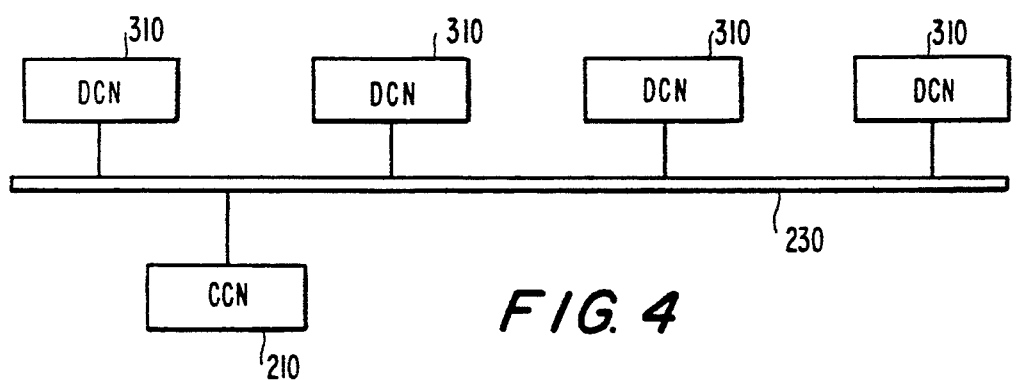
FIG. 4 is a block diagram of the distributed control configurations according to the invention.

The configuration of the network using only DCNs 310 is shown in FIG. 4. Up to 31 of DCNs 310 can be connected to the bus. Each of DCNs 310 can communicate with any other of DCNs 310, including CCN 210, at a peer-to-peer communication level. Thus one of DCNs 310 can establish a logical data link to another DCN 310. The role of the network master CCN 210 in this configuration is to provide network services such as collecting or distributing information for access control for bus 320 at power up, monitoring the network, and performing network diagnostics. CCN 210 can also perform the functions of one of DCNs 310.

Figure 5:
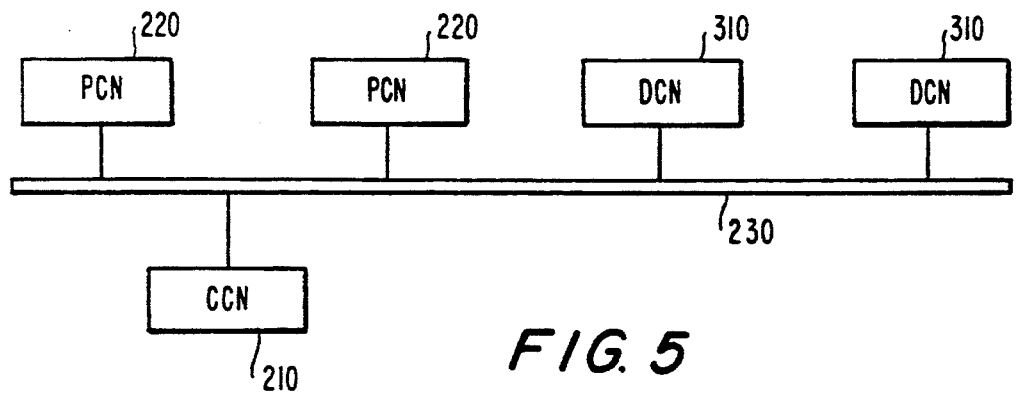
FIG. 5 is a block diagram of the combined control configuration according to the invention.

It is also possible to combine both PCNs 220 and DCNs 310 in a single network, as shown in FIG. 5. Up to 31 mixed nodes can be connected to bus 230. CCN 210 tightly controls the access right of a node on bus 230. CCN 210 gives priority to one of PCNs 220 over DCNs 310 since PCNs 220 generally require synchronized communications with high refresh rates, whereas the critical issue for DCN 310 communication is the message latency time and duplicate message protection. After all the communication needs for PCNs 220 are met, CCN 210 calculates the amount of available time for a communication from one of DCNs 310 to another of DCNs 310 and may issue the command that allows one of DCNs 310 to initiate transmission. It is assumed that the bandwidth of the communication channel is large enough to handle PCNs 220 and DCNs 310. In this configuration, DCNs 310 are not allowed to talk to PCNs 220 directly, and PCN 220 to PCN 220 communication is also not allowed. If one of DCNs 310 must talk to one of PCNs 220, CCN 210 relays the messages.

Figure 6:
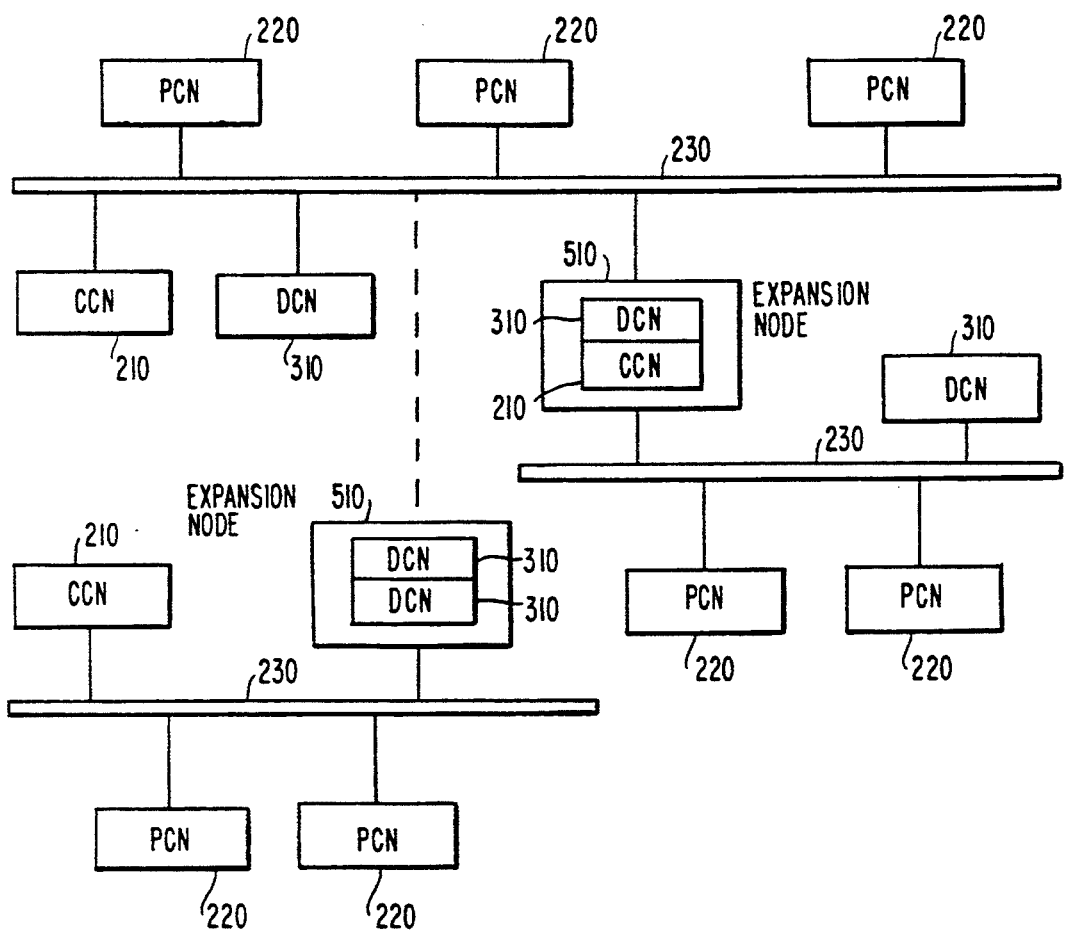
FIG. 6 is a block diagram of an expanded configuration according to the inventions.

Additionally, the system can be expanded as shown in FIG. 6. Expansion node 510 is constructed to perform the functions of both DCN 310 and CCN 210. Expansion node 510 connect to a network in the same manner as would one of DCNs 310, being in control of PCNs 220 on a sub-network in the same manner as would CCN 210.

Preferred specifications for systems employing motion control communication architecture 10 are provided in Table 1.

TABLE 1

| | |
|---|---|
| PHYSICAL LAYER: | twisted pair RS485 (may require shielding) |
| DISTANCE: | maximum 75 feet |
| MAXIMUM NUMBER OF NODES: | 32 (1 CCN with any combination of DCNs & PCNs) |
| DATA RATE: | Selectable at network initialization (10 Mbps, 5 Mbps, 2.5 Mbps, 1.25 Mpbs, 675 Kbps) |
| FRAMING TECHNIQUE: | SDLC (International Business Machines, Inc. Synchronous Data Link Control, General Information, IBM Form GA27-3093) |
| COMMUNICATION SUPPORTED | |
| DISTRIBUTED: | CPU-to-CPU |
| CENTRALIZED: | Master/Slave from central CPU to smart I/O nodes |
| ACCESS CONTROL | |
| DISTRIBUTED: | time slot access among CPU nodes |
| CENTRALIZED: | time synchronous on a solicited basis |
| ERROR DETECTION: | SDLC 16 Bit CRC with immediate acknowledgment |
| ERROR RECOVERY | |
| DISTRIBUTED: | acknowledgment with retry & duplicate protection |
| CENTRALIZED: | high refresh rate to smart I/O nodes |
| DATA LENGTH | |
| DISTRIBUTED: | up to 33 bytes of data dedicated to a user |
| CENTRALIZED: | up to 8 bytes of data |
| PERFORMANCE @ 10 Mbps | |
| DISTRIBUTED: | maximum message latency <5 ms assuming at least 30% of bandwidth allocated to DCNs |
| CENTRALIZED: | 1 ms average refreshes of up to 31 PCNs |
| APPLICATION LEVEL SUPPORT REQUIREKENTS AUTOMATIC SYSTEM CONFIGURATION MODULARITY: MANUFACTURING/ SERVICE DIAGNOSTICS SOFTWARE DOWNLOAD CAPABILITY | Option to add identical modules with little/no adjustments |

Motion control systems using communication architecture 10 may comprise many modules which are identified as major subassemblies. From the viewpoint of communication, however, a module may be considered a communication node. When modules are interconnected by cables, the network controller (CCN 210) may need to determine the physical order of module connections. Identical modules may be connected in series in a system. Therefore, as will be shown, an optional wire may be included in the communication cable to meet this requirement, in addition to communication signal lines.

In all system configurations, nodes preferably share bidirectional RS485 multi-drop bus 230, although other hardware implementations such as fiber optic cables, IEEE 802.3 10-base-T buses, or open collector buses could also be used. Bus 230 can be as long as 75 feet end-to-end and run as high as 10 Mbps. Longer lengths may be provided at either lower speeds (<10 Mbps) or in a ring topology with other communications media.

Up to 32 nodes—one mandatory CCN 210 and a combination of up to 31 PCNs 220 and DCNs 310—can be linked on bus 230.

For communication, with only PCNs 220, the bandwidth capacity of the system is large enough to handle the sampling rate of 1000 samples per second per PCN 220 for up to 31 PCNs 220 to support very high performance motors. One sampling consists of one frame from CCN 210 to PCN 220 and the response frame from PCN 220 to the CCN 210. Each frame has 8 bytes of information data. A frame in this context includes all framing overheads to deliver information data. The system allows a user to allocate the sampling capacity among PCNs 220, since some PCNs 220 may require more than 1000 samples per second and other PCNs 220 may operate with much less sampling. Within a fixed capacity, various allocations are possible, such as 2000 samples/second for all 16 nodes, or 2000 samples/second for 10 nodes and 500 samples/second for another 20 nodes.

It is possible to dynamically adjust the sampling rate for various ones of PCNs 220 to accommodate high performance needs of some of PCNs 220 during certain portions of the machine cycles and to allow other PCNs to achieve higher performance during other periods of the machine cycle without exceeding the overall communication bandwidth of PCNs 220 that is afforded by the network.

For communication with only DCNs 310, the system should be able to support a data throughput of 30,000 messages (average 16 bytes long) per second to support graphics data update requirements. A message without framing overheads can be 1 to 33 bytes long, and can be delivered from one of DCNs 310 to any other of DCNs 310 with a positive acknowledgement. The latency time of a frame does not exceed 5 ms. Messages larger than 33 bytes are handled by a robust software communication driver. (In the strict definition of the Synchronous Data Link Control (SDLC), the source address field of communication architecture 10 is part of the SDLC data field. A user can send a message of up to 33 bytes excluding the source address, which is handled automatically by the communication hardware of architecture 10).

For the combined network, the system provides a means for a user to allocate capacity between PCNs 220 and DCNs 310. Allocation priority is preferably given to PCNs 220. A user preferably schedules communication traffic in a optimized fashion to meet the latency requirements of DCN 310 within the limit of the channel bandwidth.

Physical layer parameters of motion control communication architecture 10 are inter-dependent and also affect the communication hardware design and protocol. The selected channel topology is a multi-drop, bi-directional, half-duplex differential signal bus, with a target operating speed of up to 10 Mbps (megabits per second). Thus, logic circuits governing communication must conform to this speed as well. At power-up, the system operates at the lowest default speed, 675 Kbps (kilobits per second). A user can set the network to a higher speed: 1.25 Mbps, 2.5 Mbps, 5 Mbps, or up to 10 Mbps. As the speed is selectable, the term "bit time" will be used, since it is speed-independent.

The channel does not generate excessive electromagnetic noise, and at the same time withstands the noise from the environment. Within a system, noise to the channel may come from high speed logic, driver circuits, motors, and ground differentials. A differential driver which meets the and RS485 standard is used. Such a transceiver is vendor available and can operate up to 35 Mbps.

With respect to channel length, as the overall length between the two ends of the network is preferably less than 75 feet, propagation delay calculations are based on the maximum length of 75 feet. The delay time is also affected by modulation speed and cable type. The connection length to the channel cable as measured from the output of the transceiver is preferably kept to a minimum. The communication channel preferably is also matched to the impedance of a selected cable. The number of conductors for the serial communication signal preferably is kept to two, which applies to both the cable and the connector. An optional conducting wire to determine the physical order of node connections may be required. In harsh environments, the cable may be shielded for signal protection from noise, while at a slow speed and/or in clean environments, shielding may not be required.

Up to 32 nodes can be connected to bus 230. For example, for a network using only PCNs 220, there can be up to 31 of PCNs 220 and one CCN 210. For a network using only DCNs 310, up to 31 DCNs 310 and one CCN 210 can be linked to the channel.

Figure 7:
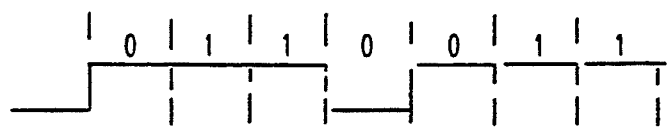
FIG. 7 is a diagram of an example of a preferred embodiment of an encoding scheme used in the present invention.

High speed switching may emit electrical noise and electrical components may become expensive. For this implementation, the NRZI (non-return-to-zero inverted) encoding scheme of SDLC is used. NRZI encoding transmits data by changing the state of the output whenever a logical 0 is being transmitted. Whenever a logical 1 is transmitted the state of the output remains the same as the previous bit and remains valid for the entire bit time. An example is shown in FIG. 7. In SDLC, bit stuffing is used in conjunction with the NRZI encoding. When five consecutive logical 1's are encountered in the data stream, the 0 bit is inserted.

Figure 8:
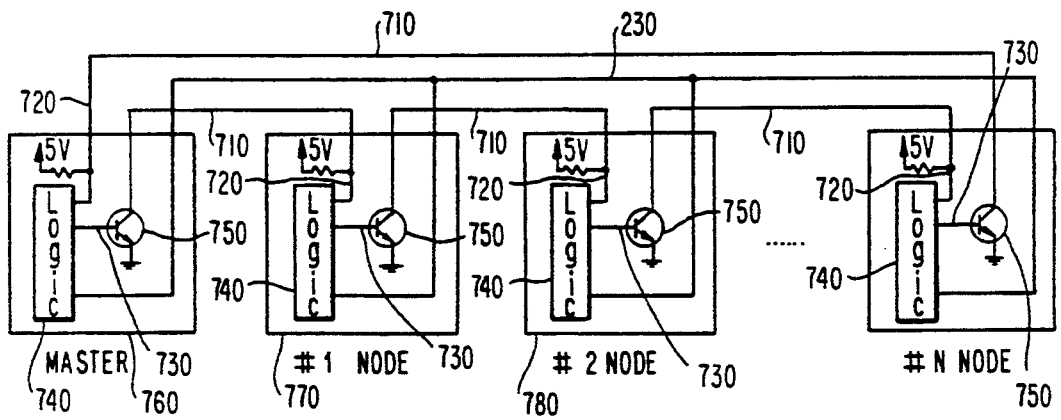
FIG. 8 is a schematic diagram showing third line interconnections according to the invention.

Architecture 10 preferably adopts multi-drop bus 230, which does not, in and of itself, provide a means of determining the physical order of connection. To provide for modularity, an optional connection is used in addition to multi-drop bus 230. (By "modularity" herein is meant the capability to install modules which are identical to perform the same function at different physical locations in a motion control system.) CCN 210 then determines the identity and physical locations of all nodes and downloads new addresses as necessary to distinguish identical modules, as will be described more fully below. Since the RS485 differential signal uses two wires, this optional connection is frequently referred to as a "third wire". Referring to FIG. 8 third wire is used to form a low cost ring. The control signal traveling in conjunction with the communication can determine the physical order. For the low cost ring, each node has input sensing line 720, logic 740 and output line 730 connected to driver 750, which drives input sensing line 720 of the neighboring node.

Figure 10:
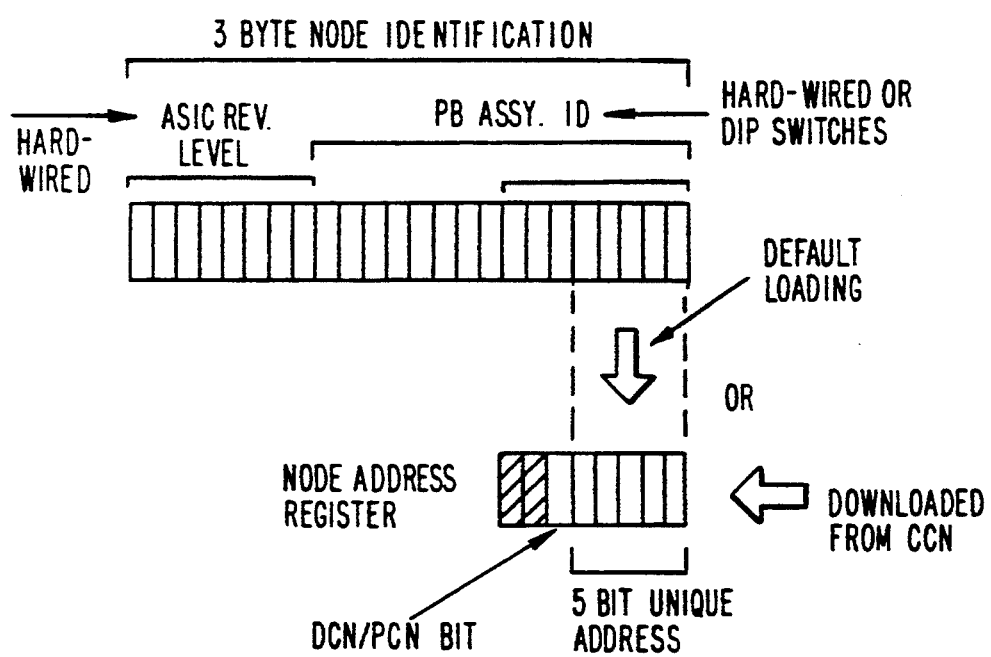
FIG. 10 is a diagram of a node identification (ID) and node address according to the invention.

Architecture 10 preferably provides for the determination of the physical order of connection as follows. To reset the network, master 760 (typically CCN 210) pulls its open collector output (line 730) low. Each node on the network responds to a low input on line 720 by resetting and pulling its open collector output low; whereby the reset signal propagates through the network. (Here, all of the system electronics are held in a reset state with the exception of CCN 210). Master 760, to restart the communication network, raises its open collector output to high, and broadcasts a message soliciting a response from the node which has just come out of reset. Neighboring node 770 responds with its node identification, including its default address, as shown in FIG. 10. Then master 760 asks node 770 to raise its open collector output. This will create the same situation on second node 780 as first node 770 experienced. Master 760 repeats the broadcast message, and the process repeats until master 760 senses its input line is high. By this process master 760 determines the physical order of node connections, the number of nodes, and the type of each node (PCN 220 or DCN 310).

Master 760 then resets the network again by pulling its open collector output low. When master 760 senses its input 720 low it again raises its open collector output and then broadcasts a new address, if needed, and then sends a command to raise the open collector output. Each node responds to the new broadcast address only if its input 720 is high and it has not as yet received a command to raise its open collector output. This process is repeated for each node so that the network is configured with a unique address for each node.

This low cost ring can be implemented using an open collector output with a pull-up resistor at the input of the neighboring node. In this case, the receiver may require a simple digital filter to compensate for electrical noise between two neighboring nodes or a more expensive RS485 driver may need to be used. The selection of this interface is determined by the system grounding topology.

Architecture 10 employs a simple protocol at the data link layer, as this expedites documentation, implementation, debugging/testing, and increases reliability.

Figure 9:
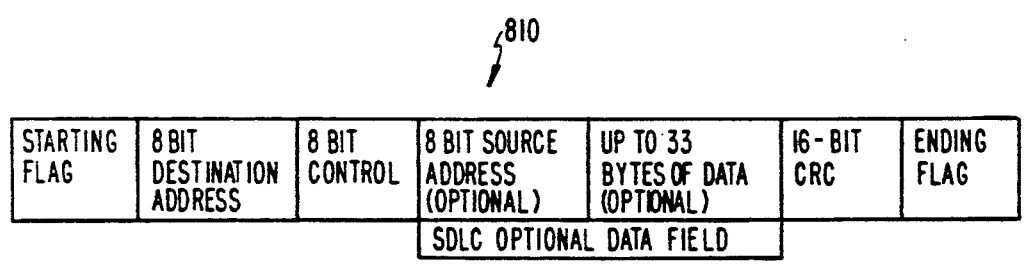
FIG. 9 is diagram of a chosen Synchronous Data Link Control (SDLC) frame according to the invention.

The specifications herein apply to the data link control (DLC) layer and below in the layered communication architecture 10. In this context, a communication node consists of many layers. A higher layer above the data link layer, possibly the network layer or the application layer, assembles a message and requests the data link layer to send it. A frame, or packet, is constructed by adding necessary bits to a message. In the DLC level, all messages are delivered via frame 810. The chosen SDLC frame 810 is shown in FIG. 9. Frame 810 consists of the starting flag, an address(es), one byte of control, an optional data field, cyclic redundant check (CRC) bits that cover from the address field to the optional data field, and the ending flag. A message is put in the data field, and its length is 8 bytes for communication with PCNs 220 and 33 bytes for DCN 310 excluding the source address. For communication with DCNs 310, the optional data field may need to be present, as architecture 10 uses the first byte in the optional data field as a source address. The destination address field, the control field, and the CRC field are identified by the two flags. Therefore the length of a message can be determined in a frame without a byte count. The received data is available to a user through a FIFO interface. Similarly, for transmitted data a FIFO interface is used to provide user data to the communications hardware.

Architecture 10 preferably only adopts SDLC frame 710, and is not the SDLC in terms of logical data link control. Architecture 10 has its own definition for the control field, and uses both source and destination addresses for communication with DCNs 310.

A node preferably must be able to detect the starting flag to initiate the receiving process and the ending flag to finish reception of Frame 710. The bit pattern for the flags must be unique, not repeated inside frame 710. When a node detects the ending flag, with or without a framing error (i.e., a frame is too short or too long), it should return to the re-start state as soon as possible. The SDLC specifies 01111110 as the starting/ending flag. Since NRZI encoding defines 0 as having a transition at the beginning of a bit time, the quiescent, or idle, state of the channel signal must be the opposite of the signal level after the first 0 transition of frame 710. Since this very first transition from the quiescent state may take a longer time compared with other bit transitions in a high speed and long transmission line, there is a two bit pattern (0 followed by 1) preceding the 01111110 starting flag. This pattern, which may be considered a type of preamble, is used by the receiver for frame synchronization. To transmit multiple frames 710, there preferably is a predetermined amount of dead time between the ending flag and the start of a new frame 710.

Referring to FIG. 10, each node, including CNN 210, preferably has a node identification (ID) of three bytes. Part of the node ID will be used as the default node address. Each node preferably has a node address register, which is used by the address recognition hardware. The node address register is loaded by default with the lower bits of the node identification. It can be modified by CCN 210 when the network is configured with the modularity option. FIG. 10 illustrates the loading of a node address register.

Within the motion control system, functional modules are components that communicate with other modules. Identifying a module within a system or within a series of related systems is important for controlling system releases and for configuring systems. Architecture 10 provides for electronic identification and identifies the revision level of the corresponding communication application specific integrated circuit (ASIC). The electronic identification of a module can use a multi-position switch, and part of it can be used as a physical address (e.g. 5 bits). CCN 210 preferably uses a reserved command to query a node for its identification information. When one of PCNs 220 or DCNs 310 receives this command, it preferably reports the three byte register value to CCN 210.

The value of a node address register preferably appears in the destination address field of the SDLC frame. Architecture 10 preferably also uses a source address, which must come from a node address register as well. To identify up to 32 PCNs 210 and 32 DCNs 310 uniquely, 6 bits are required. A five bit position switch may be used in addition to a node type bit preprogrammed in the ASIC. Only CNN 210 can generate the broadcast address, while all PCNs 220 and DCNs 310 are able to receive broadcasted frames. The modularity option of architecture 10 makes it possible to download addresses. If addresses are not downloaded, the hard-wire physical address must be unique within the range in Table 2.

TABLE 2

| Node address value | | | |
|---|---|---|---|
| CCN: | x0000000 | | |
| DCN: | x0000001 | -x0011111 | (01–1F) |
| PCN | x0100000 | -x0111111 | (20–3F) |
| Broadcast to all: | x1xxxxxx | | | x: don't care bit

Even with the modularity option, a user may opt not to download addresses. If addresses are to be downloaded, CCN 210 assigns a unique address to each node corresponding to the physical order of connection. The downloading process preferably does not rely on a destination address, but uses the broadcasting address in conjunction with the third wire.

In a peer to peer communication such as that from DCN 310 to DCN 310, receiving nodes can identify which node sent a frame, since the first byte in the optional data field of frame 710 is filled with a source address for DCN 310 communication. Communications with PCNs 220 do not need to employ source addresses, since CCN 210 controls all PCNs 220 directly.

CCN 210 strictly controls access to bus 230 for all nodes. For communication with PCNs 220, CCN 210 sends frame 710 to PCN 220. This is the only opportunity for addressed PCN 220 to transmit. For communication with DCNs 310, CCN 210 issues a command for a DCN 310 to DCN 310 (or CCN 210) communication. If CCN 210 desires to send a frame to DCN 310, it can do so without issuing a special access control command. While DCNs 310 contain hardware logic for access control, PCN 220 does not require any special logic. The address recognition capability of PCN 220 is sufficient to allow response to a command from CCN 210.

Figure 11:
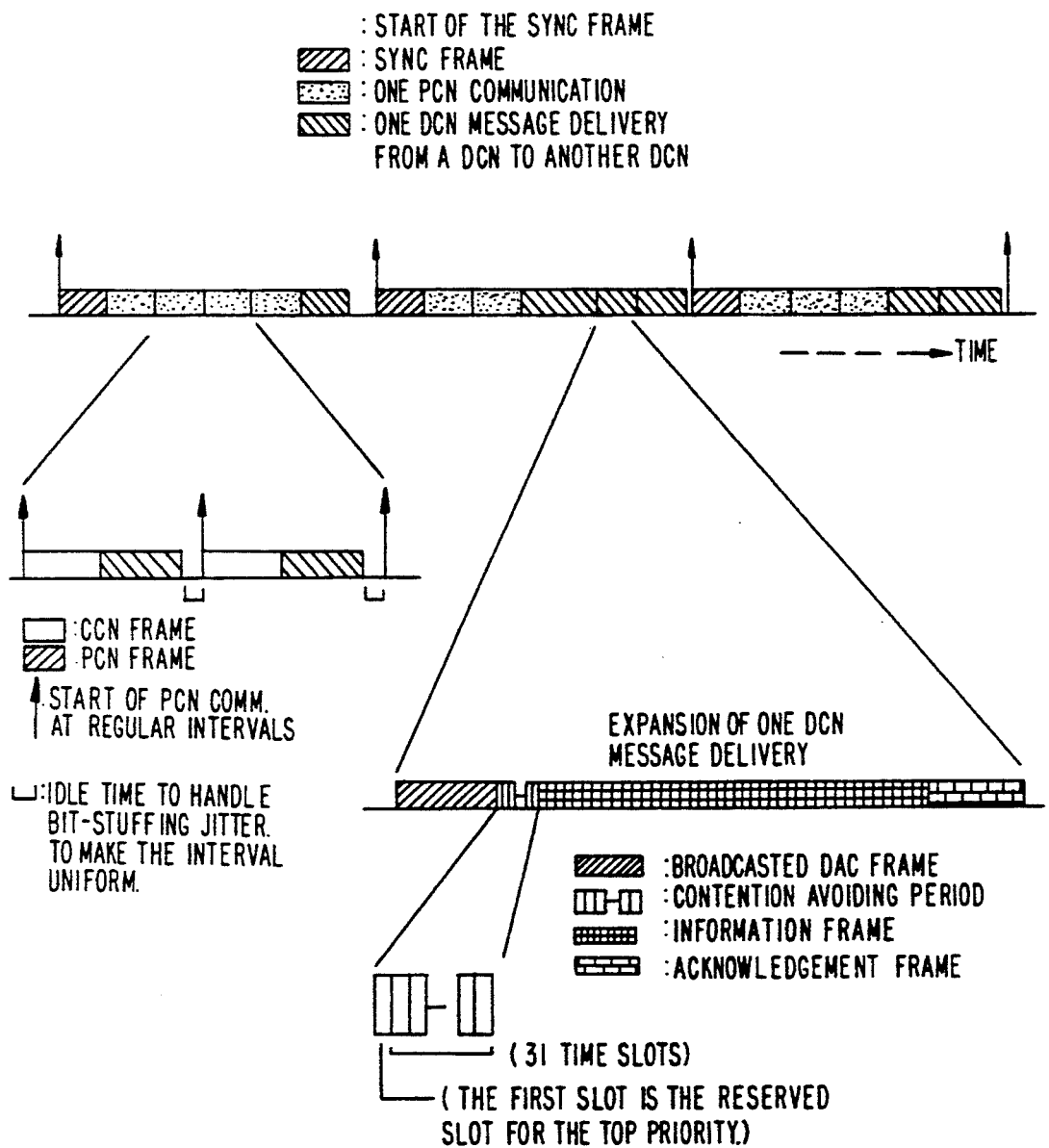
FIG. 11 is a diagram illustrating access controls according to the invention.

Referring to FIG. 11, to support the I/O functions of PCNs 220, CCN 210 periodically scans PCNs 220. Architecture 10 provides users with the capability to control the individual scanning rate for each PCN 220. For this purpose, CCN 210 broadcasts a special frame, called the synchronization frame (SYNC frame), to all nodes. The interval for SYNC frames preferably is user-configurable, typically between 500 microseconds and one millisecond. In the normal mode of operation of architecture 10, SYNC frames preferably appear on bus 230 like clock pulses. The time interval between two consecutive SYNC frames is called the (SYNC) tick period.

The SYNC frame is primarily for PCNs 220. Absence of SYNC frames on bus 230 could indicate an error condition. A SYNC frame watchdog timer may be designed to turn off I/O lines of PCN 220. PCN 220 can also utilize the SYNC frame to eliminate a timing jitter due to bit stuffing or other causes. During one tick period, many frames can be transmitted to different PCNs 220. For perfect timing PCN 220 can operate in a "synchronized" mode and hold a received frame and execute its contents in synchronization with the end of a SYNC frame. In the synchronized mode PCNs 220 can be configured to sample input lines simultaneously utilizing the SYNC frame as well. In this way, a highly sychronized snap shot of all sensors in the system can be obtained.

To eliminate timing jitter due to the bit stuffing of the SDLC protocol, CCN 210 only starts to transmit in the beginning of a regular time interval. This interval is determined by assuming worst case bit stuffing for a given system using architecture 10. For 8 bytes of data of all logical 1's, 12 bits of logical 0's must be stuffed. The maximum buffer sizes for a transmit buffer and receive buffer of PCN 220 are determined by CCN 210 after examining the table of node identifications. Within a system using architecture 10, PCNs 220 may have different communication buffer sizes. The synchronized transmission of the messages of PCN 220 is based on the maximum size of the buffers of PCN 220. Thus, application programs should preferably specify this interval for communications with PCNs 220.

DCNs 310 also recognize the SYNC frame since with PCNs 220, for instance, some activities of DCNs 310 may need to be synchronized to the activities of PCNs 220.

Communication between CCN 210 and PCNs 220 can also be in an "immediate" mode where PCNs respond to messages immediately to direct received data to its output lines and/or to return its immediate status. Preferably, to maintain synchronization, CCN 210 will always communicate with a given PCN 220 during the same time interval, relative to the SYNC frame, of a tick period.

As an example, assume a network includes three PCNs 220, A, B and C. Also assume that node A requires updating every tick period while nodes B and C only require updating every other tick period. Communications might then be scheduled A, B; A, C; A, B; etc. Those skilled in the art will recognize that by scheduling communications with a period comprising an integral number of tick periods servo functions for motion control and the like are greatly simplified. However those skilled in the art will also recognize that, for applications which can tolerate a certain amount of jitter in the timing of communications, communications in the immediate mode need not be periodic.

In a preferred embodiment of the subject invention, each PCN 220 and the network may selectively operate in either a synchronized or immediate mode, and the network as whole may operate in a synchronized, immediate or mixed mode.

The access control for DCNs 310 is designed to guarantee the latency time of DCN 310, i.e., the maximum waiting time to transmit. Since a user may utilize the entire bandwidth for PCNs 220, a user must allocate some bandwidth for DCNs 310 if any are present. Architecture 10 provides the means for a user to control the maximum latency of DCNs 310. A user may dynamically select a short latency time for an important one of DCNs 310.

After CCN 210 finishes its planned communication with PCNs 220 within a tick period, it calculates the time left before the next SYNC frame. If the time is long enough for a communication of DCN 310, CCN 210 initiates DCN 310 to DCN 310 communication as illustrated in FIG. 11. Up to one message may then be exchanged between two DCNs. Subsequently, CCN 210 recalculates the remaining time before the following SYNC frame and the process may repeat.

DCN 310 to DCN 310 or DCN 310 to CCN 210, communications consist of the broadcasted DAC (DCN access control) frame by CCN 210, the contention avoiding period, an information frame transmitted by DCN 310, and an acknowledgement frame by another one of DCN 310. DCNs 310 cooperate to avoid contention during the contention avoiding period. For this purpose, DCNs 310 utilize the data in the DAC frame as well as data in their internal memory that was downloaded from CCN 210 at the network configuration time.

The contention avoiding period consists of one priority and 32 time slots, for a total of 33 slots. A time slot is defined as a time period when DCNs 310 can detect the start of a frame transmission by other DCNs. The period of a time slot must be determined considering the timing constants of the transceiver circuitry of DCN 310, the delay due to logical decision making, the channel length, and the propagation delay. One slot time in a multidrop bus may last a few bit times or a fraction of a bit time. Alternatively, architecture 10 could employ a ring configuration, though the time slot period would be longer.

Architecture 10 offers the priority slot for a motion control subsystem, where CCN 210 may wait for an event to occur in a particular one of DCNs 310. Such events may happen in various DCNs 310. If anticipating an important event, DCNs 310 should be given a high priority. To serve this need, CCN 210 preferably has the capability to assign a particular DCN 310 to transmit immediately after a DAC frame using the priority slot. CCN 210 may cancel the assignment of the priority mode and move it to another DCN. DCNs 310 have flags indicating whether they should operate in the priority mode or in the slot mode. Details of the access control of DCNs 310 are shown in FIGS. 11-14.

Figure 12:
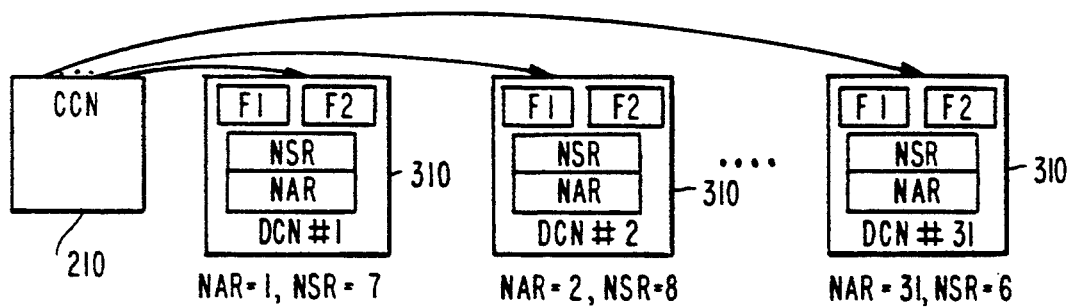
FIG. 12 is a diagram illustrating distributed control node (DCN) access control at power up according to the invention.
Figure 13:
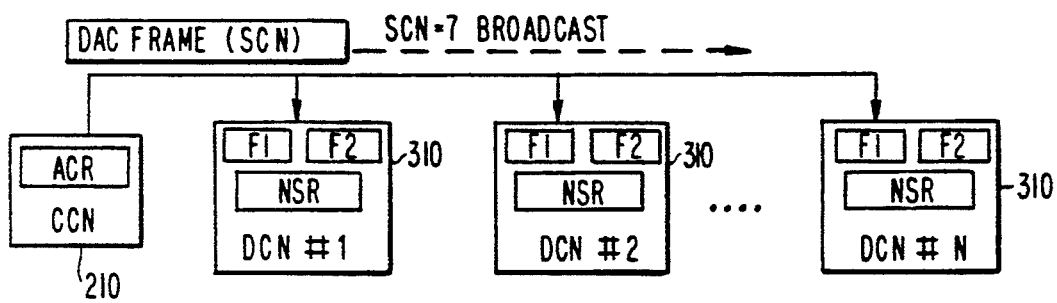
FIG. 13 is a diagram illustrating DCN access control during normal operation according to the invention.
Figure 14:
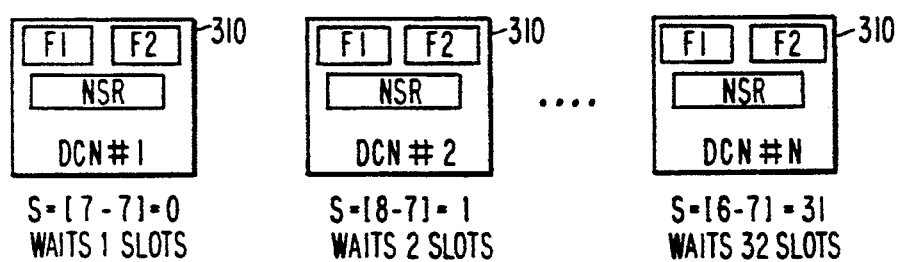
FIG. 14 is a diagram illustrating how a DCN calculates a slot time to avoid contention according to the invention.

Referring to FIG. 12, to coordinate DCNs 310 in the contention avoiding period, CCN 210 preferably downloads a unique number to each of DCNs 310 at the network configuration time. DCN 310 stores the number in its node slot register (NSR). Note in FIG. 12, F1 is the priority mode bit (CCN 210 writes to F1 via a frame), F2 is a bit set/cleared by DCN 310 to prevent consecutive transmissions, and DCN 310 also contains a node address register (NAR). For DCN 310 communication in normal operation shown in FIG. 13, CCN 210 preferably also broadcasts a slot control number (SCN) in the DAC frame. The SCN designates the node to transmit using the first time slot right after the priority slot. For example, if a node receives the SCN in a DAC frame equal to the NSR value, i.e. the difference is zero, it can transmit after the priority slot. As shown in FIG. 14, DCNs 310 calculate the difference between the SCN and the NSR in modulo 32 arithmetic, which tells how many slots one of DCNs 310 must wait before it initiates a transmission. The difference is unique among DCNs 310 since the NSR in DCN 310 is unique among DCNs 310. No two NSR values are duplicated to prevent contention. CCN 210 changes the SCN value so that all DCNs 310 have an equal chance to access bus 230.

Figure 15:
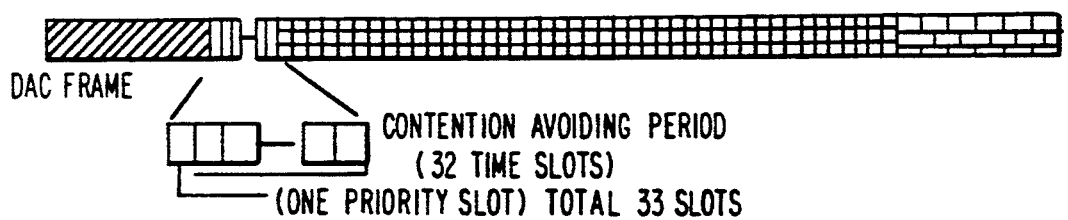
FIG. 15 is a diagram further illustrating how a DCN avoids contention according to the invention.

Referring to FIG. 15, DCN 310, if it has a message to transmit and after it receives a DAC frame, initiates a transmission in the priority slot if DCN 310 is in the priority mode. Otherwise, DCN 310 waits the period which corresponds to the difference between the NSR and the received SCN. If no communication is detected during this period, then DCN 310 initiates a transmission. Otherwise, DCN 310 must wait for the next DAC frame to repeat the process. When a frame is transmitted by DCN 310, then receiving DCN 310 immediately sends an acknowledgment frame. After DCN 310 transmits a frame successfully, it will refrain from initiating a transmission in the next contention avoiding period so that other DCNs 310 will have possible access.

For the system with 31 DCNs 310, i.e., the maximum configuration, the NSR value may be the node address in each DCN 310. The NSR default value is the node address at reset. CCN 210 can download the values to the NSRs to change the default values. The NSR value must be unique, as with an address for DCN 310. The downloading capability allows a user to freely (re)configure DCNs 310 to meet requirements in terms of access controls.

In order to improve the efficiency for networks with substantially fewer than 31 DCNs 310, the hardware for CCN 210 preferably generates the DACs in an optimized fashion. The SCN in a DAC frame is copied from the access control register (ACR) of CCN 210. The ACR is automatically incremented every DAC frame. If the ACR reaches a certain maximum value (user specifiable), the register resets to repeat. The maximum value can be the number of DCNs 310 on the network. Utilizing this feature, a communication driver can be constructed to optimize the access controls.

CCN 210 may repeat DAC frames within a tick period as long as the remaining time before the next SYNC frame is long enough for one DCN communication. If there are no activities involving DCNs 310, it is possible to observe many DAC frames in a row without any other frames.

In a preferred, lower cost embodiment, CCN 210 waits for a predetermined time equal to the sum of the contention avoidance period and the worst case time for a PCN 310 communication and then increments the ARC register and transmits a DAC frame if sufficient time remains.

If it is desired to more fully use the bandwidth of the network, CCN 210 may monitor the network and transmit a DAC frame immediately after the contention avoiding period if no DCN 310 has begun transmission, or at the end of a message, if sufficient time remains.

As is shown in Table 2, CCN 210 is preferably assigned address OO(hex), which is a DCN 310 address; i.e. the DCN/PCN bit is a zero. Thus for real time communication between CCN 210 and a DCN 310 (as opposed to system configuration or communication control) CCN 210 operates in substantially the same manner, and includes substantially the same circuitry, as described above for DCN 310.

Architecture 10 can detect three types of errors: framing error, time-out, and CRC error. Detection of an error condition is preferably implemented entirely by hardware. Although a node can detect various types of errors, it preferably posts in its status register only whether an error occurred or not. A data stream which does not fit into a defined frame is considered as a framing error. Examples include: an undefined flag pattern when one is expected, a premature ending flag, an unexpected starting flag, an undefined address, an undefined control code, an exceeding of the predefined length of a data field, or an existence of a data field when no data field is expected.

A time-out error is declared when an expected event does not occur. When CCN 210 transmits a command to PCN 220, it expects a response message or an explicit acknowledgment from addressed PCN 220 immediately, since this function is implemented in hardware. If no response is received within a few bit times, CCN 210 detects the time-out error for PCN 220. When PCN 220 does not receive the SYNC frame regularly, it detects the time-out error. When DCN 310 transmits a data (information) frame to another DCN 310, it expects a positive or negative acknowledgment from the receiving node within a few bit times. In this case the transmitting DCN 310 detects the time-out error.

Figure 16:
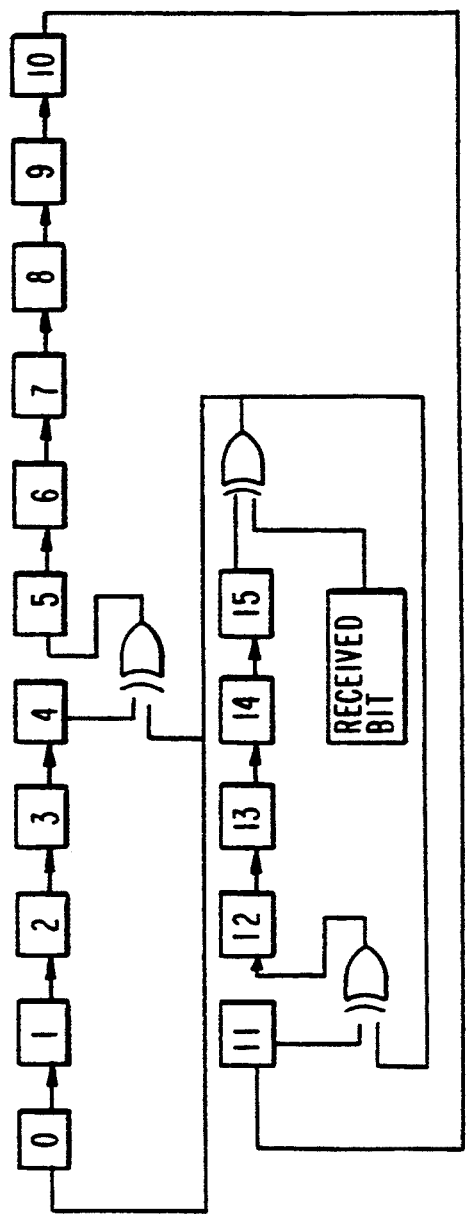
FIG. 16 is a diagram showing a 16-bit cyclical redundancy check (CRC) according to the invention.

The cyclical redundancy check (CRC) generation and check is the most important means for detecting errors. The CRC-16 is preferably used as a frame check sequence, and is represented by the algebraic expression $X^{16}+X^{15}\ldots +X^2+1$. The CRC generation is shown in FIG. 16. In operation, a bit is received, is XOR'd with bit 15 of the current CRC, and placed in temporary storage. The result of XOR'ing bit 15 with the received bit is then XOR'd with bit 4 and bit 11 as the CRC is shifted one position to the right. The bit in temporary storage is shifted into position O.

Architecture 10 preferably uses two types of frames: information frames and control frames. The frame type can be specified in the control field. One of the control frames is the acknowledgment (ACK) frame. Acknowledgment in architecture 10 can be explicit using the ACK frame or can be implied when a response frame is received.

For communication with PCNs 220, CCN 210 sends a frame, then within several bit times, addressed PCN 220 sends back a frame which implies acknowledgment. Due to the high rate of scanning of PCNs 220, CCN 210 does not acknowledge to PCN 220.

For communication with DCN 310, all frames are preferably acknowledged via the ACK frame within several bit times. However, the ACK frame itself need not be, and preferably is not acknowledged. Information frames of DCN 310 use both source and destination addresses. Since an ACK frame immediately follows an information frame, the ACK frame does not use the source address. This immediate acknowledgment is adopted to avoid message buffering. DCN 310 will send a negative response using the acknowledge frame format only if it cannot receive a frame due to the unavailability of a receiving buffer.

A receiving node may detect either a framing error or a CRC error. It may collect the type and occurrences of errors, discard the garbled frame, but not perform error recovery. A transmitting node is always responsible for error recovery upon detecting a time-out error or a framing error in an acknowledgment. This strategy eliminates possible contentions accessing the bus in error recovery.

For communication with PCNs 220, there shall be no error recovery. Rather, errors are ignored. However, if CCN 210 detects excessive communication errors during a predetermined period, it may choose to shut down the network.

For communication with DCNs 310, error recovery relies on re-try. For the time-out error condition or an error in the expected ACK frame, the transmitting node will try many times before declaring that a communication link to an addressed node is broken. The re-transmission time interval must be long enough so that an environmental condition causing the error might no longer exist. Therefore, DCN 310 does not immediately retry, but waits for its next opportunity determined by a retransmission delay timer. If a DCN, via the ACK frame format, indicates that it cannot receive a message due to an unavailable buffer, the retransmission time interval should be long enough so that the CPU of DCN 310 unloads its receiving buffer. Architecture 10 requires DCN 310 to unload its receiving buffer within a predetermined maximum time.

PCNs 220 and DCNs 310 have one transmit buffer and one receive buffer under the control of communication hardware. On the other hand, CCN 210 has up to 31 pairs of buffers for communication with PCNs 220 and only one pair of buffers for communication with DCNs 310. PCN 220 is designed to overwrite its receiving buffer after a good CRC. CCN 210 makes its receiving buffer available when it transmits to PCN 220. DCN 310 is free to transmit a message to another DCN 310, assuming that the addressed node has a receiving buffer available. If a negative response is received, then initiating DCN 310 re-transmits.

Message sequencing (communication with DCNs 310 only) is introduced to detect duplicate messages (i.e., an identical message is transmitted more than once due to re-transmission upon detecting an error in the ACK frame, or there is no ACK). A duplicate message is acknowledged and discarded. Since queuing of a message is not used and every message is acknowledged, one bit per one way node to node communication suffices. As there are up to 31 of DCNs 310 and CCN 310, 64 bits of memory space are needed per DCN 310 to store 32 pairs of message sequence numbers. This differs from the SDLC scheme which allows a node to send up to seven messages without acknowledgement since it specifies up to seven receive buffers and uses three bits for the message sequence number. This sequence number is used to detect duplicate messages. Since the hardware of architecture 10 can afford only one receive buffer, one pair of bits is enough to detect a duplicate message.

For message sequencing, preferably only two nodes, such as node A and B, are involved. There is preferably one pair of sequence numbers per one way transmission (i.e., the transmit sequence number of node A is only associated with the receive sequence number of node B). A node maintains one pair of receive-transmit sequence numbers since it transmits as well as it receives. Sequence numbers are preferably synchronized (reset to zero) when the network is initialized at power up. When node A transmits a message, it preferably sends its stored transmit sequence number in the control field. If node B receives the message without an error, it then flips the receiving sequence number and responds back with the ACK frame. When node A receives the ACK correctly, it flips the transmit sequence number, finishing one cycle. At the end of each successful cycle, the transmit sequence number of node A and the receive sequence number of node B should be the same. A sequence number is included in a message frame, but not included in the ACK frame.

Suppose that node A sent a frame and node B experienced an error. Node B does not acknowledge. No sequence bits are affected, and node A should retransmit. In another case, suppose that node A sent a frame and node B received it correctly. Node B sent an acknowledgement, but node A experienced an error. Therefore, node A will retransmit the frame, although node B already received that frame correctly. The sequence bit protects node B from receiving a duplicated frame.

A receiving node can thus detect a duplicated message, because its stored sequence number does not match the received sequence number. The node discards the duplicated message, but still sends back the ACK frame again. If this ACK frame is delivered correctly, the pair of sequence numbers of one way transmission are synchronized again. The data link layer may need to report the link establishment to a higher layer. When sequence numbers are initialized, receiving and transmitting buffers should be emptied.

Logic functions related to frame generation, receiving, interpretation and related actions are implemented by hardware. Architecture 10 minimizes the number of frames defined when possible. Although architecture 10 employs the SDLC frame, architecture 10 defines the control field of a SDLC frame its own way in order to implement the data link controls in hardware. Architecture 10 also offers additional features which are essential in system development, such as a hardware reset signal or node identification.

As with the SDLC, there are two types of frames: information (data) frames and control frames. An information frame carries a message, while control frames control communications in order to bring up the network to the condition in which information frames can be exchanged. A frame's type is distinguished by the code in the control field. Shown in FIG. 17 is the frame format for a control frame from CCN 210. FIG. 18 shows the frame format for a data frame from CCN 210 to PCN 220 or vice versa, while FIG. 19 shows the format for a data frame from DCN 310 (CCN 210) to DCN 310.

Frame exchanges can be grouped in the following categories: network configuration (baud rate, third-wire related such as address downloading), network control (SYNC frame, access priority assign/cancellation), status/register inquiry, write to control registers, boundary-scan-logic related, or real-time related. Some exchanges are for all nodes, some for PCNs only, and others for DCNs only.

FIGS. 20–22 show network configuration frame exchanges. Shown in FIG. 20 is the broadcast of CCN 210 for baud rate set. Here, BCA=(x1xxxxx), BRS=data specifying the baud rate (one byte). Note, every node should set the baud rate. Shown in FIG. 21 is the broadcast of CCN 210 for a network with the third-wire option (modularity). FIG. 21A shows the receipt of a downloaded address if the third wire input is low and the third wire output is high. Here, BCA=(x1xxxxx), DCF22=indicate that the PCN or DCN received the address. FIG. 21B shows setting the third wire output high if the third wire input is high and the third wire output is low. Here, BCA=(x1xxxxx), DCF3=lower the third wire, DCF33=lowered. FIG. 22 shows the network configuration frame (software implemented), where CCN 210 tells DCN 310 what DCNs 310 and PCNs 220 are on the network.

FIGS. 23A, 23B, 24A, and 24B show the reads/writes to node registers of CCN 210. Shown in FIGS. 23A and 23B are the status inquiries (or register readings) to a node of CCN 210. Here, DA=node address, CCNA=0, SADD=source address, DCF4, DCF44, DCF5, DATA8=up to 8 bytes, DATA33=up to 33 bytes. These commands are for reading node registers and status. FIGS. 24A and 24B show the writes to control/configuration register(s) of CCN 210. Here, DCF6,. In FIG. 24A the response of PCN 220 is a dummy frame indicating an acknowledgement.

FIGS. 25 and 26 show network control frame exchanges. Shown in FIG. 25 is the frame exchange for access priority assign cancel to DCN 310. Here, DCF9=indicate assign/cancel the high priority, DCF99=ACK or (NAK). FIG. 26 shows the SYNC frame broadcast. Here, DCF7=code indicating the SYNC frame.

CCN 210 acts to initiate the scan logic tests. This can be based on information provided by a stand-alone test device connected to the network or based on system self-test information that is built into CCN 210. Here, CCN 210 generates test vectors which are shifted through a network connection to the scan logic of those nodes of CCN 210, PCNs 310 and PCNs 220 that have integrated circuits with scan test support. These nodes are set to the appropriate scan test mode. Note, the boundary scan logic result (if any) can be read by using a CCN 210 the polling command.

FIGS. 27, 28, 29A, and 29B show boundary scan related frame exchanges. Shown in FIG. 27 is the frame exchange for boundary scan logic data to DCNs 310 and/or PCNs 220. Here, DCFA=indicate the boundary scan logic message, DCFA=code for ACK or NAK. FIG. 28 shows the frame that is provided by CCN 210 to DCNs 310 and PCNs 220 to instruct the boundary scan logic to set the scan mode (for example, to cause an application-logic-to-scan-logic data transfer or vice versa, DCFX=set the scan mode to be executed). CCN 210, DCNs 310 and PCNs 220 preferably may contain integrated circuits that support scan logic test support pins; these circuits can be connected in a daisy-chain fashion to form a scan test serial ring, or scan logic, which begins and ends at the network circuitry of CCN 210, DCNs 310 and PCNs 220. FIG. 29A shows polling to DCN 310 and/or PCN 220 for the boundary-scan logic result. If DCN 310 boundary-scan logic is not ready, FIG. 29B applies. Here, DCFB=polling command, DCFBB=indicate a data frame, DCFBC=indicate no message to send.

FIGS. 30 and 31 show data frame exchanges. Shown in FIG. 30 is the data exchange between CCN 210 and PCN 220. Here, DCF8, DCF88=code indicating data exchange between CCN 210 and PCN 210. FIG. 31 shows the data frame from CCN 210 to DCN 310 (sequence number used). Here, DCFC=code indicating a data frame, DCF99=code for ACK or NAK.

FIG. 32 shows the data frame from DCN 310 to DCN 310 (or CCN 210) (sequence number used). Here, DCFD=code indicating a DAC frame, SCN=slot number, DCFE=code indicating a data frame, DCF99=code for ACK or NAK.

Shown in Table 3 is a collection of command codes to be determined for particularly preferred system implementations of architecture 10.

TABLE 3

DCF1 = baud rate set broadcast - baud rate data should follow
DCF2 = downloading an address to a node DCF22
DCF3 = raise the third wire output DCF33
DCF3A = network configuration frame (software generated)
DCF4 = status (register) inquiry to a PCN DCF44
DCF5 = status (register) inquiry to a DCN DCF55
DCF6 = PCN application hardware configuration comand DCF66
DCF7 = SYNC frame
DCF8 = data exchange between CCN and PCN DCF88
DCF9 = assign/cancel the access priority DCF99
DCF99 = code for ACK or NAK
DCFA = boundary-scan logic data download
DCFB = polling to a DCN for the boundary-scan logic response DCNBB, DCNBC
DCNC = CCN to DCN data frame
DCND = DAC frame
DCNE = message from a DCN to a DCN The data link layer hardware of architecture 10 does not match that of a industry standard DLC such as the SDLC or the IEEE 802.2 (International Standard 1508802-2 IEEE Std. 802.2, "Information Processing Systems-Local Area Networks-Part 2: Logical Link Control" 1989-12-31). Therefore, it may be desired to augment the hardware with software, which may be simply provided, to allow a large buffer size, a large address space, and an interface to the network layer. (The communication driver could use a 16 bit logical address to interface to the network layer, including a node address in the lower 8 bits.)

The performance of architecture 10 can be measured in several ways, including channel capacity and latency, assuming here that the network operates normally after power-up configuration and diagnostics, and excluding the channel errors due to noise or transmissions. The basic unit of communication in SDLC is a frame, which has 6 bytes (48 bits) of overhead due to framing (two flag bytes, one address byte, one control byte and two CRC bytes). On top of this overhead is the bit stuffing 0 bit that must be inserted whenever a bit stream of five consecutive logical 1's are detected. The SDLC also uses a frame for acknowledgement. In SDLC, one way to increase efficiency is to increase the length of a message. Assuming that a message is 16 bytes long on the average without acknowledgement or bit stuffing, the effective channel utilization is 73% at best.

A network user preferably allocates a portion of the total channel bandwidth to PCNs 220 and the rest to DCNs 310 to satisfy the refresh of PCN 220 and/or the scanning rate as well as the message latency time of DCN 310. In planning the allocation, PCNs 220 have a higher priority than DCNs 310. Architecture 10 provides a means for a user to configure the allocation. Basically, CCN 210 employs the time-slice scheme for an accurate scanning rate and to share the channel.

CCN 210 preferably has a timing-tick generator, the period of which can be set. Only CCN 210 starts a frame transmission to PCN 220 at the timing tick. Therefore, the period of a tick should be selected to satisfy those of PCNs 220 which require the fastest scanning rate. Scanning rates of remaining PCNs 220 are preferably equivalent to integral multiples of the selected basic tick period. It is possible that several messages of PCNs 220 be sent in one tick period.

CCN 210 preferably monitors how much time is left for the next timing tick for communication with DCNs 310. To the extent that the time left in the tick period is sufficient to finish procedures to deliver one information frame of DCN 310 before the next tick, CCN 210 may continue to issue the command to DCNs 310.

Architecture 10 preferably is designed so a user can optimize network performance. For optimum performance, there should be no waiting time for planned messages of PCNs 220. Since medium access control for the communications of DCNs 310 is deterministic, the channel can be utilized to its capacity. The maximum waiting time for a message of DCNs 310 remains constant even though network operation reaches its capacity. For a communication of PCN 220, it takes 12.4 $\mu$s to deliver 8 bytes of data to PCN 220 and to receive 8 bytes of data from PCN 220, equivalent to about 80,000 refreshes per second. For a communication of DCN 310, it takes 32.2 $\mu$s to deliver a 16 byte message from DNC 310 to another DCN 310, equivalent to about 30,000 messages per second.

The effective channel capacity is lower than 10 Mbps due to several types of communication overheads. A communication overhead of PCN 220 is only due to framing. A frame consists of 48 bits of overhead and up to 8 bytes of data. The SDLC also requires bit stuffing. Supposing that the data value of each of 8 bytes is 255, 12 bits must be stuffed (the address and CRC may also require stuffing—not shown in the implementation below). The efficiency for a PCN frame is, thus:

$$\frac{8 \times 8}{12 + (6 + 8) \times 8} \times 100 = 51.6\%$$

A complete delivery of a message of DCN 310 requires the access control frame, the slot waiting period, a framed message, and the ACK frame. Since a message can be up to 33 bytes long, the average number of 16 bytes with 10 bits of overhead for bit stuffing is used to calculate efficiency. There can be up to 31 nodes, therefore the average priority access overhead of 16 bits is assumed.

The access control frame has 56 bits: (2flags+2crcs+1add+1cmd+1data) * 8=56 bits. The average waiting period for contention is 24 bits: 16 slots×(approximately) 2.5 bits times=40 bits; the byte message is 194 bits: (7+16)×8+10=194 bits; and the ACK frame is 48 bits: 6×8=48 bits. Thus, the efficiency for a message of DCN 310 is:

$$\frac{16 \times 8}{56 + 40 + 194 + 48} \times 100 = 38.2\%$$

The efficiency for a 1 byte message or a 33 byte message is 4.2% or 56%, respectively.

One sampling, i.e., one data frame to PCN 220 (124 bits per frame) and a response data frame from PCN 220 takes 248 bit times (for 10 Mbps, about 25 microseconds). Thus, assuming the tick period of 500 µs, about 5% (25/500) of channel capacity cannot be utilized due to scanning of PCN 220. For communication of DCNs 310, delivery of a 33 byte message of DCN 310 takes 468 bit times (47 µs at 10 Mbps). Since hardware blocks a frame transmission if a remaining time to a tick is less than one data frame delivery of DCN 310, about 9.4% (47/500) of channel capacity cannot be utilized. Thus for a network with only PCNs 220, it is estimated that about 50% of channel capacity can be used for actual data delivery. The remainder represents communication overheads and forced idling (waiting) time. For the combined network, half DCNs 310 and half PCNs 220, it is estimated that about 40% of channel capacity can be used for data delivery.

Calculation of the message latency time for DCNs 310 requires knowledge of the sampling rates of all PCNs 220, and the traffic volume of communications of DCNs 310. Since a user controls the optimum operation of the network, one example estimating the channel utilization is given. Table 4 shows the traffic volume.

TABLE 4

| Time period that a PCN must be scanned | PCN nodes (Motor node name, M1, M2, ... M10) | PCN nodes (hubs, H1, H2, ... H8) | DCNs (names D1, ... D2, ..., D8) |
|---|---|---|---|
| 0.5 ms | (M1, M2) | (H2, H2) | — |
| 1.0 ms | (M3, M4, M5) | (H3, H4) | — |
| 1.5 ms | (M6, M7 ... M10) | (H5, H6) | — |
| 20 ms | — | (H7, H8) | (D1, ..., D8) |
| Message length | 8 bytes | 8 bytes | 16 bytes average |
| | total 10 nodes | total 8 nodes | total 8 nodes |

Total nodes on the network = 26
one PCN scanning including overhead: 124 × 2 = 248 bits
one DCN message delivery including overhead: 322 bits Since the fastest scanning rate is 0.5 ms., a user can assign the tick value 0.5 ms. A user can schedule as shown in Table 5.

TABLE 5

| At time 0.0: | (M1, H2, H1, H2), (M3, M4, M5), (M6, M7), D1 |
|---|---|
| At time 0.5: | (M1, M2, H1, H2), (H3, H4), (M8, M9), (H7, H8), D2 |
| At time 1.0: | (M1, M2, H1, H2), (M3, M4, M5), (M10, H5, H6), D3 |
| At time | (M1, M2, H1, H2), (M3, M4, K5), (M6, M7), D4 |

TABLE 5-continued

| At time 1.5: | (M1, M2, H1, H2), (H3, H4), (M8, M9), D5 |
|---|---|
| At time 2.0: | (M1, M2, H1, H2), (M3, M4, M5), (M10, H5, H6), D6 |
| At time 2.5: | (M1, M2, H1, H2), (M3, M4, M5), (M6, M7), D7 |
| At time 3.0: | (M1, M2, H1, H2), (H3, H4), (M8, M9), D8 |
| At time 3.5: | (M1, M2, H1, H2), (M3, M4, M5), (M10, H5, H6) |
| At time 4.0: | (M1, M2, H1, H2), (M3, M4, M5), (M6, M7) |
| At time 3.0: | (M1, M2, H1, H2), (H3, H4), (M8, M9) |
| At time 3.5: | (M1, M2, H1, H2), (M3, M4, M5), (M10, H5, H6) |
| At time 4.0: | |
| . | |
| . | |
| . | |
| At time 20.0: | (M1, M2, H1, H2), (M3, M4, M5), (M6, M7), D1 |
| At time 20.5: | (M1, M2, H1, H2), (H3, H4), (M8, M9), (H7, H8), D2 |
| At time 21.0: | (M1, M2, H1, H2), (M3, M4, M5), (M10, H5, H6), D3 |

In the above scheduling, up to 10 messages of PCNs 220 (2480 bits) and one message of DCN 310 (322 bits) are exchanged per tick period. Assuming 10 Mbps, the channel is about 56% busy ((2480+322)/5000). If the channel utilization is particularly low, a user can select a lower channel speed. In this example, the most busy tick period still does not use 220 µs out of 500 µs. Unless DCNs 310 generate more than 65 messages (average message length of 16 bytes) per 0.5 ms, DCNs 310 experience virtually no latency time.

Architecture 10 offers flexibility for use within a system, which in turn requires a series of procedures to set the network to meet the user needs. A user normally configures the network system at system power-up.

CCN 210, as the network controller, is preferably in complete control of the network. However CCN 210 does not, and cannot, constantly check the network configuration. Architecture 10 does not allow a user to add a communication node (PCN 220 or DCN 310) to the network after the system is configured. The power should be turned off when adding or removing a node. However, a network with the modularity option can reset the network while power is applied.

Figure 33:
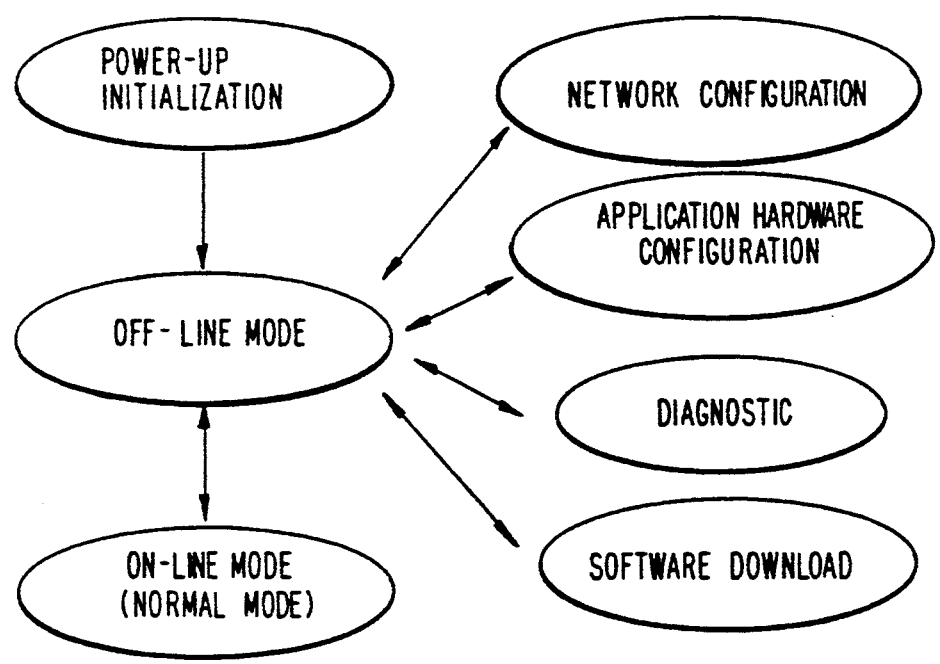
FIG. 33 is a diagram showing network state transitions according to the invention.

The network may be in one of several states: network configuration, PCN configuration, diagnostic mode, and on-line mode. FIG. 33 shows state transitions. If the network is not in the on-line mode, it is in the off-line mode. All necessary configurations and diagnostics must precede the on-line mode operation. Real-time messages can be exchanged only in the on-line (normal) mode.

The network configurations that preferably are set in the off-line mode include: identifying the existence/nonexistence of the modularity option, setting up the communication speed, identifying all nodes on the channel, down-loading addresses for the network with the modularity option, downloading the parameters related to access controls for DCNs 310, and basic communication diagnostics. Once the communication network is set, the application hardware for PCNs 220 can be configured as well as product-related functions such as boundary-scan logic or software downloading, as required.

As individual node's hardware may not be aware of the current state of the network system, a communication driver of CCN 210 may be simply provided that has a set of user configurable parameters to ensure smooth operation of the network.

DCNs 310 and PCNs 220 in a network without the modularity option rely on the hardware power-up reset. On the other hand, a network with the option may preferably be reset by using the third wire and software that may be simply provided for CCN 210. Communication hardware of PCNs 220 is reset by the network power up. The application hardware of PCNs 220 is preferably always in reset if the communication hardware is in reset. The application hardware remains in reset until CCN 210 send a command. DCNs 310 do not have application hardware to be reset through communication.

A mode at power up operates at it slowest default speed (default speed=10 Mbps/=0.625 Mbps, higher speeds are: 1.25 Mbps, 2.5 Mbps, 5 Mbps, and 10 Mbps). CCN 210 can issue the command for the baud rate set at anytime. To avoid confusion, it is recommended that a higher speed be set after the system is configured and just before entering the normal mode. Generally, the communication speed should not be re-configured in the on-line mode. In order to move up to a higher speed, CCN 210 broadcasts the baud rate set command. CCN 210 must confirm the new speed to every node in the network. For this purpose, CCN 210 should know what nodes are on the communication network.

To configure the network, CCN 210 first collects information on what nodes are on the network, i.e., the node identifiers. CCN 210 preferably determines the communication interval for PCNs 220 considering the maximum sizes of the transmit and received buffers for PCNs 220, from which information should be associated with the node identification. Knowing the number of DCNs 310 on the network is essential for the efficient access control for DCNs 310. Configuration procedures depend on the optional modularity requirement.

For a network without the modularity option, address down-loading is not needed since the address of a node is hard-wired. To configure the network for access controls for DCNs 310, CCN 210 collects the node addresses at node 310. The number of DCNs 220 is used to tell the access control hardware of DCNs 310 when to reset the auto-incrementing access control register (ACR). Examining the node addresses, the master then downloads a unique value to the node slot register (NSR) of each DCN 310. For efficiency, a set of numbers downloaded to NSRs should be sequential starting from 1. As an example, suppose that four addresses at DCNs 310 are collected, say, #5, #8, #26, and #28. The master should download #1, #2, #3, #4, #5 to the NSRs since the ACR resets when it reaches 5. A user may assign a number from the set to any node. For example, #1 can be downloaded to the NSR of node #28. Assigning or cancelling a particular DCN 310 to the high priority access control does not have to be done in the off-line mode. In fact, architecture 10 includes this feature to handle dynamic situations that occur in real-time systems.

A network with the modularity option may elect to determine the configuration of the system and to appropriately download node addresses. If addresses are not down-loaded, each node address is preferably unique and the configuration the same as in networks without this option. However, with the option a node may not have an address switch or addresses might be duplicated for identical modules. For such a network, determining the system configuration and downloading addresses precedes all other data communication. A network cannot be operated without a unique address assigned to a node.

A node receives the master broadcasting frame which contains a downloaded address based on the input state of the third wire. The master should verify the entire procedure by confirming node by node. The physical order of connection is determined at the same time as addresses are downloaded. The information on the physical order is particularly important in the paper handling environment where identical modules are connected in series. After the addresses are downloaded, the NSRs of DCNs 310 are downloaded. The value of the downloaded address of a node is often the same as the downloaded value of the NSR.

Preferably in a situation where CCN 210 assigns a particular address value based on the node ID, CCN 210 collects all node IDs after the address download. Then, the CPU has two options: (1) reset the network and download appropriate addresses again, as CCN 210 now knows the node IDs, or (2) instead of a network reset, CCN 210 rearranges the addresses by re-assigning or swapping addresses.

At power-up CCN 210 knows what DCNs 310 and CCNs 210 are on the network. Every DCN 310 preferably knows that information as well. Thus a communication software driver that may be simply provided for CCN 210 preferably generates the network configuration for every DCN 210. Upon receiving the configuration frame, a driver of DCN 310 treats the frame as a link establishment to every node included in the frame. The retry count that is used by a DCN 310 is downloaded from CCN 210.

Without the third wire, the hardware of PCNs 220 should be reset on power-up. With this option, CCN 210 controls the reset of the application hardware explicitly using the two reset-related commands: "set the application hardware reset" and "clear the application hardware reset." CCN 210, after resetting the application hardware, can proceed to configure the I/O ports of the application hardware. Whenever the communication hardware of PCN 220 is in a reset state, the corresponding application hardware should also be placed in a reset state. The third wire resets the communication portion of PCN 220 at power up. It is only when the communication hardware of PCN 220 leaves the reset state that the application hardware of PCN 220 can be brought out of the reset state. And this can only occur based on a "disable PCN reset" command from CCN 210. Note that the application hardware of PCN 220 can be forced back into the reset state by an "enable PCN reset" command from CCN 210.

PCN 220 can be equipped with configurable hardware to meet different application requirements with a minimum set of varieties of PCNs 220. Thus PCNs 220 may have a set of intelligent I/O processing functional blocks related to motion control as well as programmable I/O lines. A user preferably triggers a selected set of functional blocks and programs the I/O ports at power up. PCN 220 should not enter the normal operational mode until its application hardware is configured.

In order to perform diagnostics on PCNs 220 and DCNs 310, the communication network should be functioning. If the network cannot be operated properly, CCN 210 should identify the node causing the problem. In some cases, an operator may have to remove nodes one by one, although the use of the third wire largely alleviates this need. Preferably, a communication driver that may be simply provided should include the diagnostics to narrow down the scope of a network problem, or to pin-point the problem area.

Support is provided for PCNs 220 and DCNs 310 to incorporate boundary-scan as an option which is directly tied to communication. Boundary-scan facilitates automatic testing of electronic boards during manufacturing or product servicing. Boundary-scan accepts a test bit pattern as an input and generates an output bit pattern. Those patterns are predefined when an electronic board is developed. The boundary-scan must be performed while the application hardware is in a static state. This will require that the processing unit of DCN 310 or PCN 210 be held in an idle state and may also require that this and other application hardware of DCN 310 and PCN 210 to be held in a reset state as well.

To enter the on-line mode, all previously mentioned steps should be completed. In the on-line mode, CCN 210 starts to generate the SYNC frame and the DAC frames. In the off-line mode, those frames are absent. CCN 210 is aware of the mode change. However, PCN 220 or DCN 310 need not detect the mode change, and may simply receive a predefined command frame from CCN 210 any time, process it, and generate a predefined response frame either in the on-line mode or in the off-line mode. For communication with PCNs 220, the message sequence bits are not used. As soon as CCN 210 exchanges a frame with PCN 220 successfully, a communication link is established. Since communication with DCNs 310 uses sequence bits that are initialized to zeros at network power-up, a communication link between any pair of DCNs 310 or between CCN 210 and any DCN 310 is established if a frame is exchanged successfully. After a transmitting node sends the first frame, it should receive the acknowledgement frame successfully. This establishes a one way communication link. DCN 310 need not establish the link to every DCN 310. The communication driver of DCN 310 is responsible for establishing the logical link. When DCN 310 to DCN 310 communication fails, the entire network could be restarted to re-initialize the sequence bits of the nodes. Alternatively, after the problem has been corrected, the affected link(s) may be reestablished by sending two dummy messages in each direction.

While some functional features of networks using architecture 10 may be provided by hardware, others may be best implemented in software which may be simply provided. For instance, a communication software driver for CCN 210 might facilitate the interface to the hardware of CCN 210. Similarly, software drivers for communication of DCNs 310 could expand the limited buffer sizes of the hardware of CCN 210 and DCN 310. Additionally, a set of software modules written in, for example, the language C, for both CCN 210 and DCN 310 could download programs codes as a special case of file transfer. The downloading could support three types of memory devices: random access memory (RAM), electrically erasable programmable read only memory (EEPROM), and FLASH read only memory (FLASH ROM), where each type may have its own timing requirements. A set of routines for CCN 210 and DCN 310 could provide for file transfer in ASCII and binary formats.

Although the protocol does not allow direct talk between DCN 310 and PCN 220 due to the limited capabilities of PCN 220, which does not contain a CPU, application level software that may be simply provided for CCN 210 could relay information between PCN 220 and DCN 310. Particularly preferred, at power up, CCN 210 could be loaded with requests of DCNs 310 for specific sensor information. Also, PCN 220 could be able to notify CCN 210 when a significant event has occurred. Upon detecting that a significant sensor event has occurred, CCN 210 could check if this information has been requested by DCNs 310. If so, it could send a message to DCNs 310 with the new sensor information. Further DCN 310 could send a message to CCN 210 requesting it to modify the control to a particular one of PCNs 220. The maximum latency for sensor information of DCNs 310 to reach DCN 310 or for a request of DCN 310 for output change of PCN 220 (if altered) would be less than 5 ms.

In architecture 10, system hardware for PCNs 220, less the communication portion, may conveniently be called application hardware. Typical functions supported by application hardware include the following:

Turning off power drives: The watchdog timer of the communications core generates a signal to the application hardware if PCN 220 is not refreshed within a predefined time. Then the application hardware should turn off all PWMs, sensor scanning, and tri-state sample outputs. Thus, motors and solenoids are not left in a powered up state if the system hangs up.

Motor/Solenoid controller PWM generator: A motor control PWM signal is generated using 8-bits of duty cycle control and one direction control bit. This PWM generator should include a disable function which will shut down the PWM output for use in limiting motor winding currents. The PWM output preferably can only turn on again on the next start-of-period. In addition, stall protection must be included in this function to protect the field effect transistor (FET) drivers as these will generally fail if they are on for more than 10 to 20 ms. This may be accomplished by counting how long the PWM duty cycle is greater than a threshold. If the PWM exceeds that threshold, then the PWM output should be disabled and a flag set which is readable by CCN 210. The PWM generator should be re-enabled when the PWM command of CCN 210 is brought down to a zero value.

D/A function: A digital to analog or D/A function can be created using a simple 8-bit PWM and integrator.

A/D function: An analog to digital or A/D function supports the sensor scanning function. The A/D resolution need not exceed 8 bits and conversion speed is not critical. This A/D function can be implemented inexpensively by using the D/A function and programmable logic device (PLD) logic to control a successive approximation approach employing a binary search method. With this approach, a simple comparator is required outside of the PLD. The PLD sets a reference voltage using the D/A function to compare against the input analog voltage and makes decisions based on whether the voltage is less than or greater than the analog voltage.

Sensor scanning: The facility to scan various types of sensor provides, as a minimum, scanning of: opto-reflective sensors (with or without window obstruction and ambient light), hall switches (digital and analog), optotransmissive sensors (digital only), keyboard switches, and gap detection (detect gap and set flag, CCN 210 explicitly resets the flag).

Bit programmable I/O: At least 8 bits of configurable I/O should preferably be provided, which starts in a tri-state at power-up.

While the majority of node communication functions have been disclosed above, there exist additional features, such as error recovery and requirements which are specific to the node type. Common to all nodes is the capability to receive a frame, to generate one, and to detect CRC errors and framing errors.

Features of architecture 10 relating to PCN 220 include communication requirements and application hardware. Concerning communication requirements, for PCNs 220 it is useful to provide a watchdog timer. The watchdog timer must generate a signal to the application hardware if PCN 220 is not refreshed within a predefined time. The watchdog timer starts when the first SYNC frame is received. Note, CCN 210 should be able to read the 3 byte node identification register.

PCN 220 also supports the loop-back test, where CCN 210 sends a command to PCN 220 to repeat the frame that it receives. In the loop back mode, PCN 220 receives a message, transfers the message to its transmit buffer, and immediately transmits back to CCN 210; CCN 210 then commands PCN 220 to exit the loop-back mode.

Also, PCN 220 should continue to function even though it experiences framing errors and CRC errors. It ignores frames which are not predefined in the control field.

The communication hardware generates a signal to application hardware to indicate the reception of the SYNC frame. The output data received via the communication can be directed to output lines immediately or can be synchronized to the SYNC frame. The selection is configurable.

Sampling of input lines can be synchronized to the SYNC frame, or can be immediate. The selection is configurable as well. The communication hardware transfers only error-free messages to application hardware. The communication core of PCN 220 typically need not contain buffer memory other than the serial shift register.

Features relating to DCN 310 include the CPU interface and communication related specifications. Particularly preferred features relating to interfacing of the CPU of DCNs 310 and registers are listed in Table 5.

TABLE 5

| | |
|---|---|
| Node ID register | 3 byte node identification register. |
| Node address register (NAR) | This register is loaded with the lower 5 bits of the node ID at power-up. CCN 210 can write to this register and DCN 310 may read it. The communication hardware uses this value for address recognition and as a source address. |
| Node slot register (NSR) | This register, which is for access control, is loaded with the lower 5 bits of the node ID at power up. CCN 210 writes to this register and DCN 310 may read it. |
| Priority flag | Downloaded by CCN 210, and cleared by default. If set, DCN 310 uses the priority slot for a frame transmission. |
| Interrupt generation | An interrupt must be generated for the events: (a) received buffer ready, (b) transmit buffer empty, (c) retry limit reached, (d) maximum error count, and (e) SYNC frame received. |
| Receive related | |
| Receive flag | The communication controller sets this flag when an error free information frame is received. CCN 210 clears it. |
| Receive buffer byte count | Number of data bytes excluding any address. |
| Frame source register | The node address of a frame origin. |
| Frame control field read register. | Received frame control field |
| Receiver buffer | 33 bytes long. |
| Transmit related | |
| Transmit flag | CCN 210 sets this flag, then clears it after the buffer is transmitted successfully. (For the boundary scan frame, the communication controller clears the flag after it processes the frame. This will be quick and prior to the link establishment.) |
| Transmit buffer byte count | Number of data bytes excluding any address. |
| Frame destination address | The frame destination address. |
| Frame control field write register | Frame control field to be transmitted. |
| Transmit buffer | 33 bytes long. |
| Retransmission counter | This counter counts up to 15 and must be readable by PCN 310 and by CCN 210. When it reaches the maximum, it stays at that value. The controller clears the counter when the transmission is successful. A frame generated from DCN 310 is retransmitted automatically (in case of an error) by the communication hardware up to 15 times, with at least one interval, and at an opportune time as specified in the access control. The counter value 0 indicates no error. |
| Error flags | CCN 310 as well as DCN 310 must be able to read the following: CRC error flag, framing error, and time-out error for the expected ACK frame. |
| 32 pairs of sequence bits | There is a transmit sequence bit and a receive sequence bit for each DCN 310. All bits are zero at power up and DCN 310 is able to read the bits (read-only). The controller must also be able to detect messages requiring the sequence number and update the number. Shown below is the indexing scheme used. Note, one pair corresponding to its own node may be used for network loop-back test. |

| Index | Transmit sequence bit | Receive sequence bit | Comments |
|---|---|---|---|
| 0 | — | — | for CCN |
| 1 | — | — | for DCN 1 |
| 2 | — | — | for DCN 1 |
| . | — | — | . |
| . | — | — | . |
| 29 | — | — | . |
| 30 | — | — | for DCN 30 |
| 31 | — | — | for DCN 31 |

Concerning communication related features, CCN 210 should be able to read the 3 byte node identification register, the node slot register, priority flag, and the SYNC flag. When DCN 310 detects a SYNC frame, a pulse is generated and a flag is set, and DCN 310 can clear the flag. Also, DCN 310 supports the loop-back test, similarly to the function described referring to PCN 220.

DCN 310 should continue to function even though it experiences framing errors and CRC errors. It ignores frames that are not predefined in the control field.

Additionally, DCN 310 will use the communication capability of architecture 10 via the registers defined above. When the receive buffer flag is set, DCN 310 replies with the NAK frame to an incoming information frame. DCN 310 clears the receive flag, and the communication hardware clears the transmit flag. Likewise, DCN 310 sets the transmit flag, and the communication hardware sets the receive flag. An interrupt signal is generated if (a) a new message is received and (b) the transmit buffer becomes ready.

An information frame initiated by DCN 310 should be retransmitted if an ACK frame is not received within a predefined time. The process is repeated up to 15 additional times, and the retransmission intervals should be 1 ms. If all retransmissions fail, DCN 310 must set the error flag. CCN 210 also scans DCNs 310 regularly, shutting down the network if any of DCNs 310 has set the flag. If an information transmission of DCN 310 receives the NAK frame, then DCN 310 retransmits indefinitely every millisecond (configurable) until it receives the ACK frame.

Features of architecture 10 relating to CCN 210 include CPU interfacing, registers to control the network, buffers for control frames, interfacing with PCN 220, and hardware controls.

The interface between the communication controller of CCN 210 and the CPU of CCN 210 preferably is primarily via a shared memory. Thus registers and memories are used interchangeably in this section. Although details are to be determined, the expected interface signals are: RESET, AD0-AD15, ALE, WAIT, CS, WR, RD, INT, CLK, VCC and GND. Further, CCN 210 can enable/disable interrupts individually or as a whole. In general interrupts are generated on (1) receive buffer ready, (2) transmit buffer available, (3) significant event of PCN 220, (4) communication error, and (5) CPU of CCN 210 access to the buffer of PCN 220 that is currently being used by the communication hardware. The CPU of CCN 210 clears the interrupt flag set by the communication controller of CCN 210.

Details concerning registers to control the network are listed in Table 6. Note, all registers in Table 6 are of the read/write type unless specified otherwise.

TABLE 6

| | |
|---|---|
| Node ID register | 3 byte node identification register. |
| Baud rate register | The CPU of CCN 210 can set a code for the commmication controller to use one of the five defined rates: 0–0.625 Mbps, 1–1.25 Kbps, 2–2.5 Mbps, 3–5 Mbps, and 4–10 Mbps. |
| PCN transmit interval | A frame transmitting interval of PCN 220 in the normal mode of operation. |
| Tick Period Register | The CPU of CCN 210 can set the tick period in terms of the number the communication controller clocks. It is one of the most important parameters that a user can use to schedule communication using PCNs 220. |
| Modularity option indicator | This bit is set when the communication controller detects the presence of the cable for the optional modularity, it clears otherwise. Its presence is indicated by the third wire input being low at power up. |
| Register for the number of PCNs (PCNR) | CCN 210 writes to this memory after it determines the number of PCNs 220 on the network. The communication controller may utilize this information. |
| Register for the number of DCNs (DCNR) | CCN 210 writes to this memory after it determines the number of DCNs 310 on the network. The communication controller may utilize this information. |
| Node address register (NAR) | This register is loaded with the lower 5 bits of the node ID at power up. CCN 210 can write to this register and DCN 310 should be able to read it. The communication hardware uses this value for address recognition and as a source address. |
| Node slot register (NSR) | This register is loaded with the lower 5 bits of the node ID at power up. CCN 210 writes to this register and DCN 310 should be able to read it. This is for providing access control. |
| Priority flag | This is downloaded by CCN 210 and cleared by default. If it is set, DCN 310 uses the priority slot for a frame transmission. |
| Access control register (ACR) | This is an incrementing counter, and resets to zero when it reaches the value in the DCNR (number of DCNs 310). The value of the ACR is used in assembling a DAC frame. The ACR increments only if CCN 210 detects a frame from DCN 310 immediately after the DAC frame. |
| Error counter | Whenever a communication error is detected, it is incremented. This counter can be cleared by the CPU. |

Details concerning buffers for control frames and DCN 310 are listed in Table 7.

TABLE 7

| | |
|---|---|
| Receive related | |
| Receive flag | The communication controller sets this flag when an error free information frame is received. The CPU clears it. |
| Receive buffer byte count | The number of data bytes excluding any address. |
| Frame source register | The node address of a frame origin. |
| Frame control field read register | This is received frame control field. |
| Receiver buffer | This is 33 bytes long. |
| Transmit related | |
| Transmit flag | The CPU sets this flag. Then the controller clears it after it transmits the buffer successfully. |
| Transmit buffer byte count | Number of data bytes excluding any address. |
| Frame destination address | The frame destination address. |
| Frame control field write register | Frame control field to be transmitted. |
| Transmit buffer | This is 33 bytes long. |
| Retransmission counter | This counter counts up to 15 and must be readable by DCN 310 and by CCN 210. When it reaches the maximum, it stays at that value. The controller clears it when the transmission is successful. DCN-bounded information frame shall be automatically retransmitted, (in case of an error) by the communication hardware up to 15 times, with at least a one millisecond interval at an opportune time specified in the access control. A counter value of 0 indicates no error. |
| Error flags | CCN 210 as well as DCN 310 must be able to read the following: CRC error flag, framing error, and time-out error for the expected ACK frame. |
| 32 pairs of sequence bits | There is a transmit sequence bit and a receive sequence bit for each DCN 310. All bits are zero at power-up. DCN 310 must be able to read the bits (read-only). The controller must be able to detect messages which require the sequence number and update this number. Shown below is the indexing scheme used. |

TABLE 7-continued

| Index | Transmit sequence bit | Receive sequence bit | Comments |
|---|---|---|---|
| 0 | — | — | not used |
| 1 | — | — | for DCN 1 |
| 2 | — | — | for DCN 1 |
| . | — | — | . |
| . | — | — | . |
| 29 | — | — | . |
| 30 | — | — | for DCN 30 |
| 31 | — | — | for DCN 31 |

Concerning the interface registers for PCN 220, CCN 210 should maintain 4 "significant PCN event" registers; 8 of PCNs 220 per 8 bit register.

Also, there should be 4 "significant event mask" registers; 8 PCNs 220 per 8-bit register. These register bits enable/disable a "significant PCN interrupt" to CCN 210.

If a significant event occurs from one of PCNs 220 having its significant event mask enabled, then an interrupt should go to CCN 210. Moreover, a significant event interrupt vector should be generated to speed CCN 210 to take the appropriate action. Also, if more than one enabled significant event for one of PCNs 220 occurs, then after CCN 210 handles the first vector in line, it will be reinterrupted with the next until all significant events are resolved.

CCN 210 also sets a scan flag to trigger the scanning of the buffer table. Reset of the controller clears it. The controller examines each entity, and if the tick register is downcounted to zero, then the controller transmits the buffer and receive a frame. If the controller does not receive a frame, then it sets the error flag. The process repeats for all the table entities. At the end of one scan and before starting over, CCN 210 should be able to determine the remaining time of a tick period. If there is time left for a communication of DCN 310, it will issue the DAC frame. The DAC frames may be repeated until the next tick signal. If CCN 210 has its own message for DCN 310, it transmits the message before issuing the command.

The controller writes the index of the buffer table to the scan index register to indicate to PCN 220 it is communicating. Preferably, software that may be simply provided for the CCN 210, by reading this register and the transmit and receive flags, could know the buffer that the controller is currently using. Except for this buffer, CCN 210 should be able to read/write all buffers. However, CCN 210 should not access a buffer being communicated. This would strictly be handled in software. If CCN 210 attempts to access the active buffer, the access attempt will fail and an interrupt will be generated. This is intended as debug support, as in a final system CCN 210 should never access an active buffer. Note, there are two possibilities: first, CCN 210 tries to access a buffer that is already active, and second, CCN 210 is accessing a buffer that becomes active. The communication hardware will send buffers as scheduled and will not stop on this contention.

The communication controller hardware of CCN 210 offers many capabilities. CCN 210 should also have a communication software driver that may be simply provided to fully utilize the hardware capabilities. The driver also could provide additional logical functions for the logical link controls. Preferably, the first task of the driver is to configure the network. If the modularity option is to be used, determining the product configuration with the physical order of connection and down-loading the addresses would precede all other commands. The driver could recover any errors.

The next step is to collect all of the node IDs, node addresses, the number of PCNs 220, and the number of DCNs 310. The PCNR and the DCNR should be loaded accordingly. Next, appropriate values should be down-loaded to the slot registers of DCN 310, and if necessary, a particular DCN 310 should be assigned to the top priority for the access controls of DCNs 310. This concludes the network configuration. If desirable, DCNs 310 can be diagnosed one by one using the boundary-scan logic frames.

After the network is configured and tested, the application hardware of PCN 220 can be released from the reset state. The application hardware of PCN 220 should also be configured. At this point the system is ready for on-line operation. All errors are collected by the driver, which can shut down the network if the number of error occurrences is excessive.

To monitor communication bus 230, a test circuit implemented in a field programmable gate array (FPGA) or other form of electronics preferably provides the capability to recognize the baud rate command and set the rate accordingly. Also, the test circuit should provide the capability to recognize the starting and ending flags and capture all the bytes between the two flags. The test circuit further should interface to the PC bus and provide a timer which can be set by a user in the range from one microsecond to hours. The hardware should also be able to catch all frames. One way to achieve this is to use 64-byte buffer per frame and increment the buffer pointer by the hardware.

In order to test the network and to create abnormal cases, a test application specific integrated circuit (ASIC) is preferably used to provide the capability to generate a bit pattern specified by a user up to 54 bytes long (432 bits). The ASIC preferably also provides a selectable baud rate (5 speeds), and an interface to a PC bus.

It is further desirable to have these capabilities on one circuit board. In one circuit implementation architecture 10, the board has two main sections: the communications circuitry and application circuitry. The communications circuitry is responsible for all communication via the network and scheduling of the access PCNs 220 and DCNs 310 to the network. The applications circuitry comprises a processor such as the Intel 80196 microprocessor, available from Intel Corporation of Santa Clara, Calif., random access memory (RAM), read only memory (ROM), and an RS232 interface, and will be responsible for configuring the network via the communications circuitry and processing the data exchanged between CCNs 210 and PCNs 220 and/or CCN 210 and DCNs 310 via the communication network.

The communications circuitry may be implemented using Xilinx 4000 Series field programmable gate arrays (FPGA) available from Xilinx Corporation of San Jose, Calif., except were frequency requirements prohibit. Upon power-up or a hard reset the FPGA devices are configured either from an EPROM or from a PC through PC interface as determined by the setting of the mode switches. The lead (or master) device preferably reads the configuration data for all FPGA devices from an EPROM. All other FPGA devices are preferably loaded in daisy chain master/slave configuration. After all devices have been configured properly a light emitting diode (LED) is preferably turned on and an interrupt preferably is generated signalling that FPGA configuration is complete.

Data from the network preferably enters the board through a connector and a serial bus interface, preferably an RS485 interface chip. After the data has been filtered, the transmit clock preferably is recovered by edge detection in a high speed programmable array logic (PAL) chip. From the recovered transmit clock a receive clock is generated in the center of each incoming bit period. The receive clock is preferably resynchronized to the incoming data stream every time an edge occurs. The data is latched by this clock and made available to the rest of the circuitry.

The board preferably also has a core communications block. The core communications circuitry is preferably responsible for transmission, reception, error detection and duplicate message protection of data packets as detailed above. All bit stuffing and unstuffing, frame detection and construction, CRC generation and checking, special control frame recognition, address recognition and transmission, message sequencing, and ACK/NAK response is preferably performed by this block. In addition, any communication specific registers (e.g., baud rate, downloaded address) are preferably contained in and controlled by this block.

Figure 34:
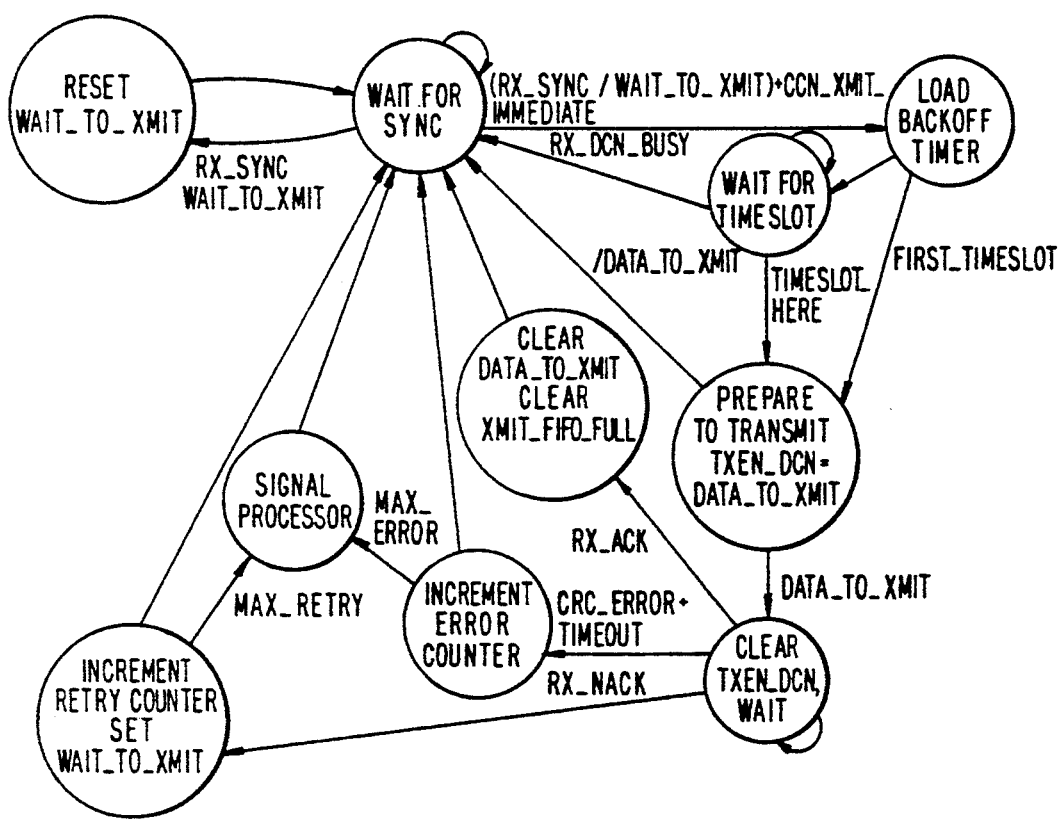
FIG. 34 is a diagram of the CCN to DCN transmit state machine according to the invention.

The board has a communications block for DCNs 310, that contains the transmit and receive first in first out (FIFOs) for communication for DCNs 310 and the access control state machines for DCNs 310. Transmit and receive FIFOs are accessible to both the core communication block and the interface for CCN 210. The state machine for DCN 310 signals the core communications block when a message is to be transmitted and determines whether or not a time-out error has occurred. The core communications block notifies the communications block for DCNs 310 when the network is busy, when an ACK has been received and when a NAK has been received. This block also signals the interface of CCN 210 when a message has been received, an error has occurred, and/or a message has been delivered correctly. The state machine for CCN 210 to DCN 310 transmission is shown in FIG. 34.

The interface between the microprocessor and PCNs 220 that reside on the network preferably is PCN RAM. All scheduling information for each PCN 220 preferably resides in the PCN RAM allocated to that PCN 220. The preferred PCN RAM organization is shown in Table 8.

TABLE 8

| | Network address | Tick Status | Data Status | Message Length | 12 Unused bytes | 8 byte Output buffer | 8 byte Input buffer |
|---|---|---|---|---|---|---|---|
| 0 | — | — | — | — | — | — | — |
| 2 | — | — | — | — | — | — | — |
| 3 | — | — | — | — | — | — | — |
| . | — | — | — | — | — | — | — |
| . | — | — | — | — | — | — | — |
| . | — | — | — | — | — | — | — |
| 30 | — | — | — | — | — | — | — |
| 31 | — | — | — | — | — | — | — |

The RAM preferably is organized to allocate a block of 19 bytes of data for each potential PCN 220. This data is readable and writable by the host processor. PCN 220 may be assigned any block of data, although the most frequently accessed PCNs 220 should be stored at the top of the RAM.

The network address byte contains the network address of PCN 220 that is assigned to a block of memory. This allows the user to have non-sequential addressing of PCNs 220 and to organize the RAM by frequency of access by PCNs 220. Referring to FIG. 35, the tick status byte contains two nibbles of information, the update rate and the time until update. The update rate nibble determines how often PCN 220 will be updated while the time until update nibble is used as a counter by the access control state machine to keep track of when to schedule the update.

The update-rate should be set by the host processor and determines how often in tick cycles PCN 220 will be updated. A value of 0 would specify updates every tick cycle, a value of 1 would specify updates every other tick cycle, etc. Update rates may be modified during operation, but caution should be used if PCN's 220 are in direct mode since the time between updates for PCN's 220 below the modified PCN 220 may skew.

The time-until-update preferably is actively modified by the access control state machine every tick cycle. Each tick cycle this nibble is examined. If it is 0, PCN 220 is updated and the nibble is reset to the update-rate. Otherwise, the value of the nibble is decremented and PCN 220 is not updated. The initial value of this nibble may be set by the host processor to more uniformly schedule accesses among PCNs 220. Care should be taken to maintain scheduling if the update-rate is changed.

Referring to FIG. 36, the data status byte provides information on the data contained for a particular one of PCNs 220. It may be used to ensure that invalid or corrupted data is not transmitted to PCN 220 or read by the processor. Four bits preferably are used to specify the status of the data for a particular PCN 220.

The error bit, ERR, preferably is set by the state machine of PCN 220 if an error occurred the last time PCN 220 was updated.

The CPU Modify bit, CM, may be set by the host processor to disable transmission of data to PCN 220 while it is being modified. A special frame will be sent to PCN 220 which will not update registers of PCN 220 but will update the status of PCN 220. If this bit is set, it must be cleared by the host processor after modification of the data of PCN 220. The use of this bit is optional.

The receive toggle bit, RT, preferably is toggled by the access control state machine every time data is received from PCN 220. The host processor may examine this bit before and after accessing the data for PCN 220 to determine if any of the data has changed since the processor began accessing data.

The no transmit last time bit, NT, preferably is set by the access control state machine if PCN 220 was not updated at its last scheduled time due to the CM bit being set by the host processor.

Referring to FIG. 37, which shows the message length, the number of bytes to transmit specifies how many of the eight bytes in the output buffer should be transmitted to PCN 220. The number of bytes to be received from PCN 220 is contained in the higher order nibble. This value preferably should be set by the host processor and is a function of the function ID of PCN 220.

Figure 38:
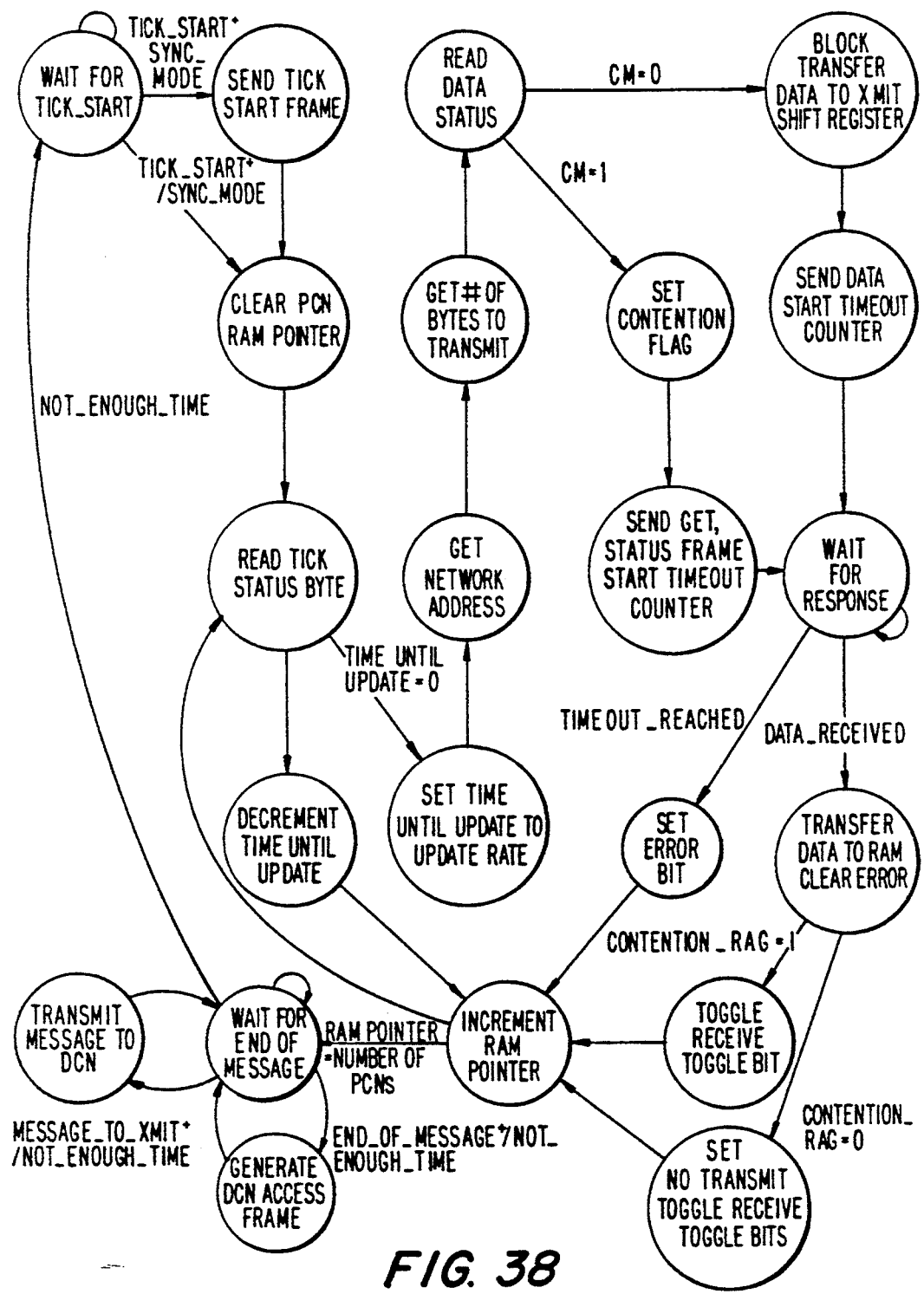
FIG. 38 is a diagram of an access state machine according to the invention.

FIG. 38 shows the access control state machine which controls all access to the network. Scheduling of PCNs 220 is maintained, communication of PCNs 220 is executed and the DCN access control frame (DAC) is generated by the access control state machine. Signals between the core communications block and the access control state machine enable the state machine to control these data communications.

The beginning of a tick period initializes the access control state machine which executes the appropriate communications for PCNs 220 based upon the data in the PCN RAM. Upon completion of communication of PCN 220, the access control state machine determines if there is enough time remaining in the tick period for a DAC frame and the associated communication of DCN 310. If there is, CCN 220 may transmit a message or transmit the DAC frame. Upon completion of the message of CCN 210 or DAC frame and possible message of DCN 310 the access control state machine will again check to see if sufficient time remains in the tick period for a DAC frame and a communication of DCN 310. This process continues until there is no longer sufficient time left in the tick period at which point the state machine waits until the beginning of the next tick period to begin communications with PCNs 220.

A microprocessor interface preferably controls access between CCN 220, PCN RAM, FIFOs of DCN 310 registers and status registers. All status and interrupt registers are contained in this block. The interface provides the microprocessor with transparent access to all internal RAM and registers.

Further, a set of status LEDs preferably provides information for board and system debug purposes. They indicate the following conditions: FPGA configuration complete, third wire in active, third wire out active, RS485 enable active, DCN transmit FIFO ready to transmit, and DCN receive FIFO has received a message.

Finally, a DIP switch preferably sets the function ID and address of CCN 210. It usually is set to zero, but may be changed to a different value to have the board of CCN 210 function as a DCN 310 for debugging purposes. Thus it is seen that a flexible serial communications motion control communication system is provided that provides for efficient communication between various elements in a motion control system, and that allows the simple incorporation of modular additions to a motion control system.

The system also provides for a reduction in the quantity of wire used to interconnect the necessary elements of a motion control system, and allows the wiring to be more readily isolated from electromagnetic and radio frequency interference.

The system also provides for systems to be readily reconfigured, speeding product development and provides for reduced system cost by increasing the number of parts that are common.

The system also provides for application level support services at power-up, including manufacturing and service diagnostics and automatic configuration of a network after system reconfiguration.

The system also provides motor control communication system nodes that may be boundary scannable for testing, and to have boundary scan information be transferable to or from a single network connection point to provide for manufacturing test and servicing diagnostics.

The system also provides for the adjustment of the communications baud rate to achieve an optimum cost/bandwidth tradeoff.

The system also provides a serial communications motion control system that allows communication between a plurality of distributed control nodes, a plurality of peripheral control nodes, and a central control node using a serial bus that communicates with the central control node, the distributed control nodes and the peripheral control nodes, and that provides a means for communicating control and data signals between the central control nodes, the distributed control nodes and the peripheral control nodes.

One skilled in the art will appreciate that the present invention can be practiced by other than the described embodiments, which are provided for purposes of illustration and not of limitation, and the present invention is limited only by the claims which follow.

We claim:

1. A communications network comprising:
    a) a plurality of control nodes for control of elements of a motion control system;
    b) a central node for communication with each of said control nodes in accordance with a schedule; wherein,
    c) said schedule comprises a sequence of equal, periodic time intervals; and,
    d) for each of said control nodes an integer is associated in accordance with said schedule; wherein,
    e) said central mode communicates with each particular one of said control nodes every nth of said intervals, where n is said integer associated with to said particular control node; and wherein,
    f) said central node varies said integers and thereby correspondingly changes a frequency of communication with at least one of said control nodes, and wherein
    g) said network further comprises means for providing said central node with configuration data, said configuration data comprising data which identifies each of said control nodes and its physical location in said network; and wherein,
    h) said central node determines said schedule for communications with said control nodes in accordance with said configuration data.

2. A network as described in claim 1 further comprising a serial communication bus for communication between said central node and said control nodes.

3. A network as described in claim 2, wherein each of said control nodes controls an element in a material handling system.

4. An apparatus as described in claim 1, wherein at least one of said control nodes is an immediate control node, said immediate control node responding immediately to communication with said central node to generate an output signal or input status data.

5. A network as described in claim 4, wherein said communication with each particular one of said immediate control nodes is at a corresponding fixed point within said time intervals, whereby said communication with said particular immediate control node is periodic with a period of n of said time intervals, where n is said integer associated with said particular immediate control node.

6. Apparatus as described in claim 1, wherein at least one of said control nodes is a synchronous control node which responds to communication with said central node to generate an output signal or input status information upon receipt of a synchronization signal.

7. A network as described in claim 6, wherein said central node generates said synchronization signal at a predetermined point in each of said time intervals.

8. A network as described in claim 1, wherein at least one of said control nodes may be selectively configured to be an immediate control node, which responds immediately to communications with said central node to generate an output signal or input status data; or to be a synchronous control node which responds to communication with said central node to generate an output signal or input status data upon receipt of a synchronization signal.

9. A network as described in claim 6, wherein said central node generates said synchronization signal at a predetermined point in each of said time intervals.

* * * * *